United States Patent
Mohri et al.

(10) Patent No.: US 7,489,806 B2
(45) Date of Patent: Feb. 10, 2009

(54) MOTION DETECTION APPARATUS

(75) Inventors: Koh Mohri, Hachioji (JP); Akio Kosaka, Hachioji (JP)

(73) Assignee: Olympus Corporation, Tokyo (JP)

( * ) Notice: Subject to any disclaimer, the term of this patent is extended or adjusted under 35 U.S.C. 154(b) by 509 days.

(21) Appl. No.: 11/113,380

(22) Filed: Apr. 22, 2005

(65) Prior Publication Data

US 2005/0232467 A1    Oct. 20, 2005

Related U.S. Application Data

(63) Continuation of application No. PCT/JP03/14070, filed on Nov. 4, 2003.

(30) Foreign Application Priority Data

Nov. 7, 2002    (JP) .............................. 2002-324014

(51) Int. Cl.
*G06K 9/00* (2006.01)

(52) U.S. Cl. .............................. 382/107; 382/103; 382/1

(58) Field of Classification Search ................. 382/107, 382/103, 106, 153; 348/113–119, 139, 148, 348/158, 135, 142, 348, 123, 136; 33/284, 33/227, 277, 280; 356/306–307; 250/221, 250/559.23, 227.14, 227.16, 227.24, 227, 250/28, 227.551; 345/8, 474, 418, 473, 475; 219/121.63; 340/540, 600, 825.19, 555–557; 341/20–21, 31; 385/13; 73/763, 774, 775, 73/800, 655

See application file for complete search history.

(56) References Cited

U.S. PATENT DOCUMENTS 5,097,252 A * 3/1992 Harvill et al. ................ 340/540
5,673,082 A * 9/1997 Wells et al. .................. 348/139

(Continued)

FOREIGN PATENT DOCUMENTS

JP    09-62437 A    3/1997
JP    2000-97637 A    4/2000

(Continued)

OTHER PUBLICATIONS

H. Fujii et al; A Registration Method Using Stereo Cameras With an Inertial Sensor for Augmented Reality; The Institute of Electronics, Information and Communication Engineers; Technical Report of IEICE, vol. 99, No. 574; Jan. 20, 2000 pp. 1-8.

(Continued)

*Primary Examiner*—Samir A Ahmed
*Assistant Examiner*—Mehdi Rashidian
(74) *Attorney, Agent, or Firm*—Frishauf, Holtz, Goodman & Chick, P.C.

(57) ABSTRACT

A motion detection apparatus includes an inertia motion detection section which detects an inertia motion of an object to be measured by using at least one of an acceleration sensor or an angular velocity sensor. An image pickup section which picks up a peripheral image of the object to be measured. An image comparison section which compares images picked up at different points in time by the image pickup section. A camera position and posture acquiring section which detects a position and a posture of the object to be measured by using a result of comparing the images by the image comparison section. A spatial position and posture acquiring section which detects a position and a posture in space of the object to be measured on the basis of information obtained by the inertia motion detection section and the camera position and posture acquiring section.

18 Claims, 9 Drawing Sheets

U.S. PATENT DOCUMENTS 6,515,669 B1 * 2/2003 Mohri ........................ 354/474
2002/0012014 A1 * 1/2002 Mohri ........................ 345/863

FOREIGN PATENT DOCUMENTS

| JP | 2000-132305 A | 5/2000 |
| --- | --- | --- |
| JP | 2000-132329 A | 5/2000 |
| JP | 2001-344053 A | 12/2001 |
| JP | 2002-7030 A | 1/2002 |
| JP | 2002-23919 A | 1/2002 |
| JP | 2002-259992 A | 9/2002 |

OTHER PUBLICATIONS

Y. Yokokoji et al; Transactions of the Virtual Reality Society of Japan; vol. 4, No. 4, Dec. 31, 1999; pp. 589-598.

Shigang Li et al., "Wandering in VR Environments by Estimating Head Pose Using an Omnican." Computer Graphics and Applications, 2002. Proceedings. 10$^{th}$ Pacific Conf on Beijing China Oct. 9-11, 2002. Los Alamitos, CA, USA.

You S et al, "Hybrid Intertial and Vision Tracking for Augmented Reality Registration." Institute of Electrical and Electronics Engineers, Proceedings IEEE 1999 Virtual Reality. Houston, TX, USA, MAr. 13-17, 1999.

Strelow D et al, "Extending shape-from-motion to noncentral onmidirectional cameras." Proceedings of the 2001 IEEE/RSJ International Conference on Intelligent Robots and Systems. (IROS 2001). Maui, Hawaii, Oct. 29-Nov. 3, 2001. vol. 1 of 4.

\* cited by examiner

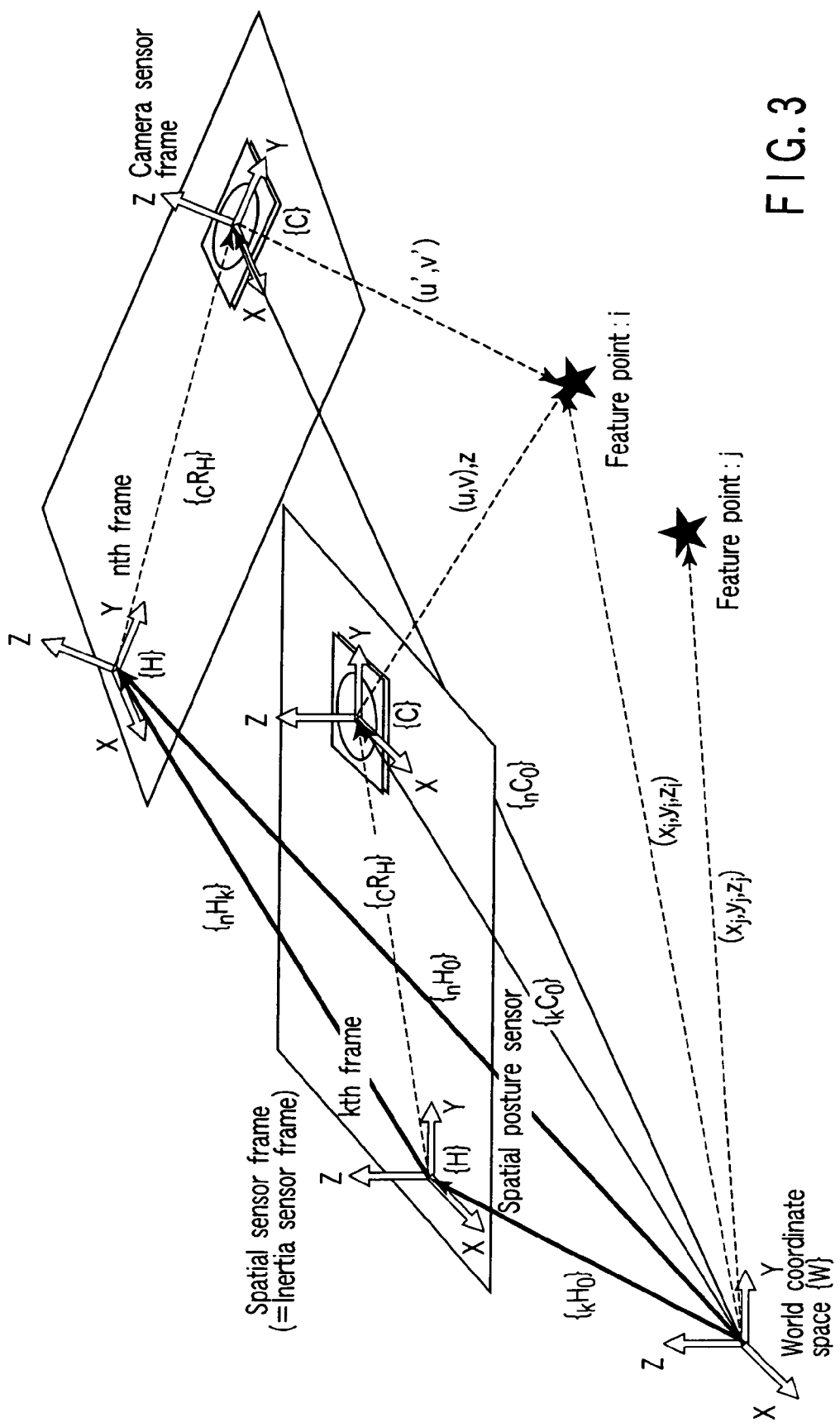
F I G. 3

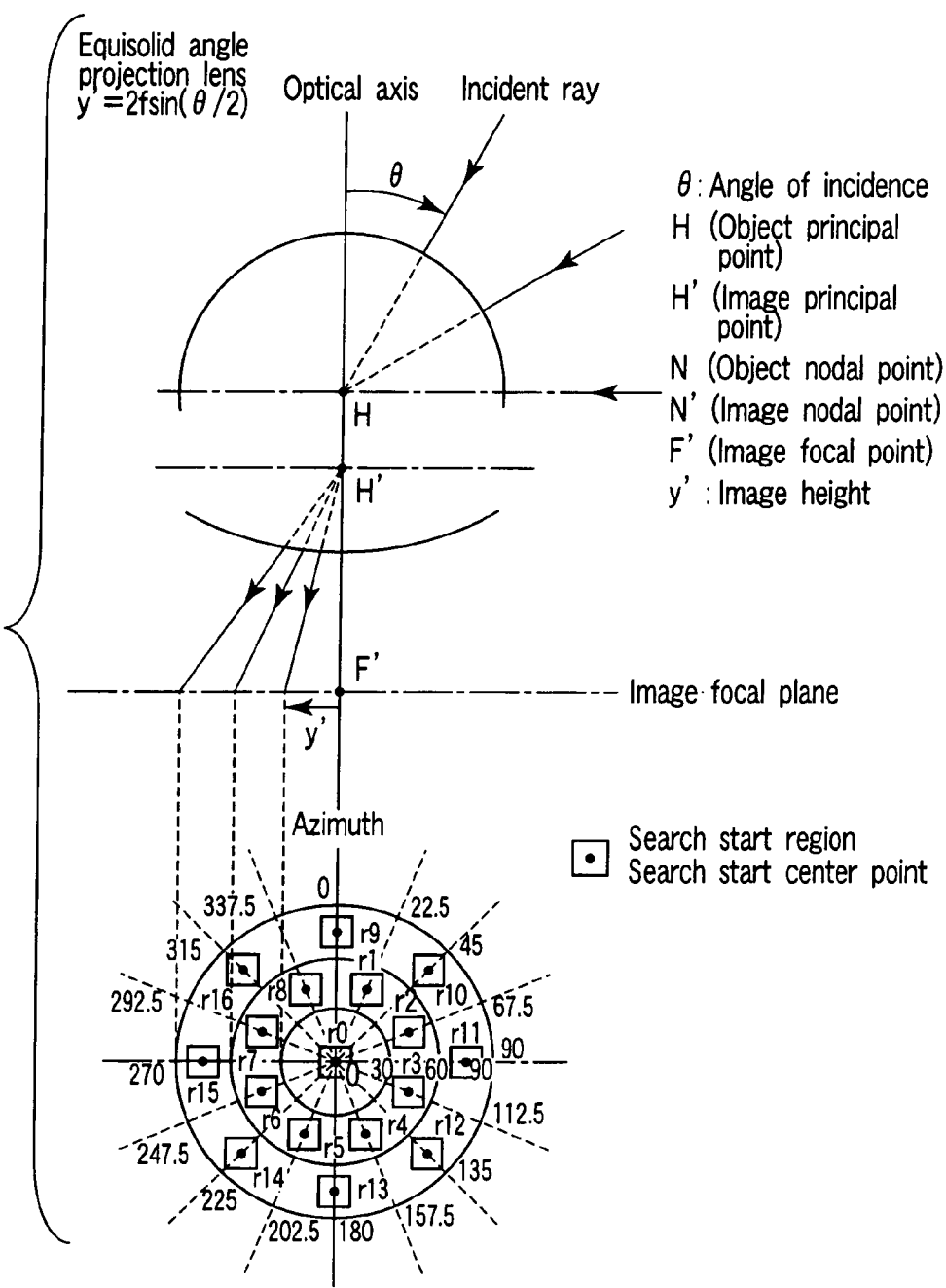
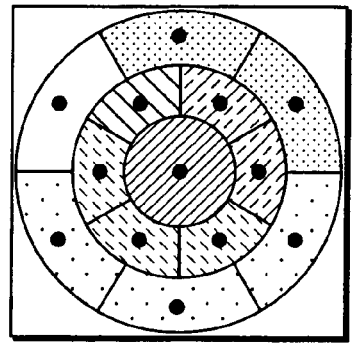
FIG. 4A
FIG. 4B

MOTION DETECTION APPARATUS

CROSS REFERENCE TO RELATED APPLICATIONS

This is a Continuation Application of PCT Application No. PCT/JP03/14070, filed Nov. 4, 2003, which was published under PCT Article 21(2) in Japanese.

This application is based upon and claims the benefit of priority from prior Japanese Patent Application No. 2002-324014, filed Nov. 7, 2002, the entire contents of which are incorporated herein by reference.

BACKGROUND OF THE INVENTION

1. Field of the Invention

The present invention relates to a motion detection apparatus which detects a position, a posture, and a movement of an object.

2. Description of the Related Art

A technology in which a sensor is mounted onto a hand of an operator, and a shape and a movement of the hand are detected, and a signal is generated on the basis of detected results thereof has been conventionally known.

For example, U.S. Pat. No. 5,097,252 proposes a technology in which a plurality of sensors formed by connecting a light source and an optical sensor with a light-guide path are mounted onto the joints of a hand Further, Jpn. Pat. Appln. KOKAI Publication No. 9-62437 proposes a computer input apparatus, in substitution for a mouse, which detects a movement in a two-dimensional direction of a hand by disposing two acceleration sensors onto the back of a gloved hand, and which detects a flexing movement of the forefinger by disposing one strain gauge onto the joint portion of a forefinger of the hand.

Moreover, in Jpn. Pat. Appln. KOKAI Publication No. 2000-132305 by the applicant, an operation input apparatus is proposed in which a shape of a hand is estimated from the position/posture of the back of hand and the postures of fingers by disposing a triaxial angular velocity sensor and a triaxial acceleration sensor which detect a position and a posture onto the back of hand and by disposing single axial angular velocity sensors which detect hooking of fingers onto the end portion of the forefinger, the end portion of the middle finger, and the end portion and the central portion of the thumb, and a command signal is generated on the basis of gestures such as a shape and a movement of the hand.

The technology proposed in the aforementioned Jpn. Pat. Appln. KOKAT Publication No. 2000-132305, i.e., the technology in which a position and a posture of the back of a hand of an operator are detected by inertia sensors including a triaxial angular velocity sensor, and postures of the fingers are detected by unconfined angular velocity sensors at the end portions thereof, and a command signal is generated on the basis of the shape of the hand has flexibility, and can be easily utilized, as compared with technologies in which sensors are disposed at joint portions as the aforementioned U.S. Pat. No. 5,097,252 and the aforementioned Jpn. Pat. Appln. KOKAT Publication No. 2000-62437, because there is no need to determine the positions of the sensors in consideration of a size of an individual hand.

BRIEF SUMMARY OF THE INVENTION

The present invention has been achieved in consideration of such problems, and an object of the present invention is to provide a motion detection apparatus which can precisely recognize a spatial position, a posture, and a movement of an object to be mounted, and a motion detection apparatus which can recognize a movement, a gesture, or the like of the body by directly or indirectly mounting such a motion detection apparatus onto a body. Further, an object of the present invention is to provide a motion detection apparatus which detects a movement of a position, a posture, and the like of an apparatus to be operated by operating an object to which such a motion detection apparatus has been mounted while being grasped or held.

In order to achieve the object, according to a first invention, there is provided a motion detection apparatus for detecting a position and a posture of an object to be measured, comprising:

an inertia motion detecting section which detects an inertia motion of the object to be measured by using at least one of an acceleration sensor and an angular velocity sensor;

an image pickup section, which is fixed to the inertia motion detecting section, which picks up a peripheral image of the object to be measured;

an image comparing section which compares images picked up at different points in time by the image pickup section;

a camera position and posture acquiring section which detects a position and a posture of the object to be measured by using a result of comparing the images by the image comparing section; and a spatial position and posture acquiring section which detects a position and a posture in space of the object to be measured on the basis of information obtained by the inertia motion detecting section and the camera position and posture acquiring section.

BRIEF DESCRIPTION OF THE SEVERAL VIEWS OF THE DRAWING

FIG. 2 is an external view of an operation input apparatus including an image pickup unit and the like.

FIG. 3 is a relational view of a spatial sensor frame and a camera sensor frame in a world coordinate space.

FIG. 4A is a view showing a relationship between rays incident onto an equisolid angle projection lens and projected images thereof.

FIG. 4B is a view showing a relationship between feature point searching start positions and image projection classification mask data.

DETAILED DESCRIPTION OF THE INVENTION

Hereinafter, an embodiment of the present invention will be described in detail with reference to the drawings.

Figure 1:
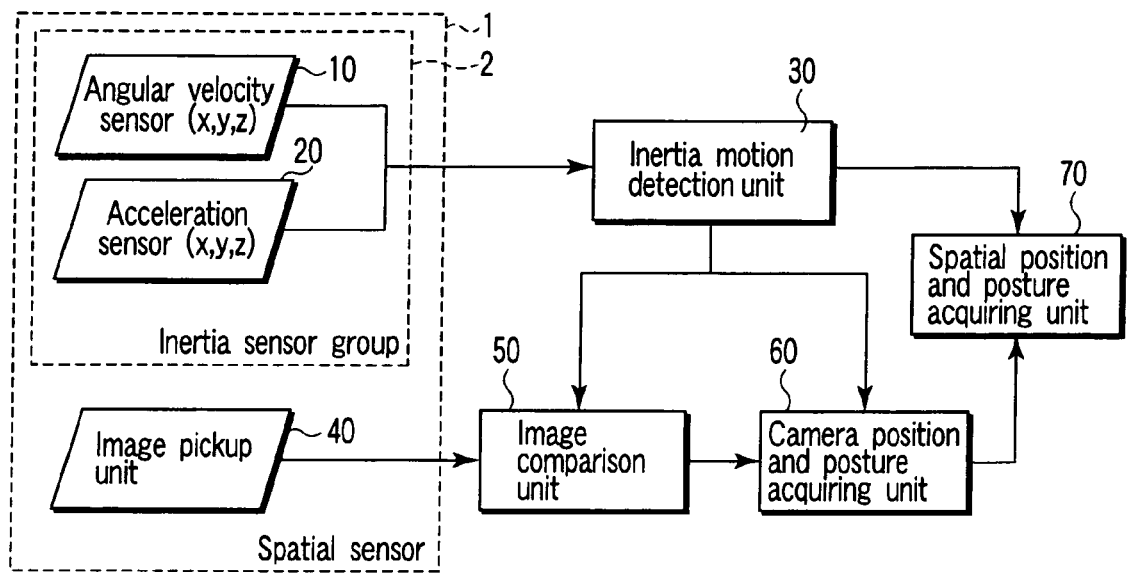
FIG. 1 is a block diagram for explanation of an outline of functional operations of a motion detection apparatus according to an embodiment of the present invention.

First, a schematic configuration of a spatial sensor system to which a motion detection apparatus according to the present embodiment is applied is shown in FIG. 1.

Output signals from an angular velocity sensor 10 and an acceleration sensor 20 which are respectively disposed in the xyz axis directions on a spatial sensor frame {H} are fetched as inertia position/posture information by an inertia motion detection unit 30. Further, peripheral image information successively fetched by an image pickup unit 40 are inputted to an image comparison unit 50. The image comparison unit 50 extracts feature points from the inputted peripheral image information, and determines the movements of the extracted feature points. A camera sensor frame {C} is obtained by a camera position and posture acquiring unit 60 on the basis of the compared information from the image comparison unit 50 and the information from the inertia motion detection unit 30. Then, a spatial sensor frame on a world coordinate space {W} is determined by a spatial position and posture acquiring unit 70 on the basis of respective posture information from the inertia motion detection unit 30 and the camera position and posture acquiring unit 60. Note that, at the image comparison unit 50, the information from the inertia motion detection unit 30 are utilized in order to reduce the cost of calculation processing.

Next, the outline of an applied example of the motion detection apparatus of the embodiment will be described.

Figure 2:
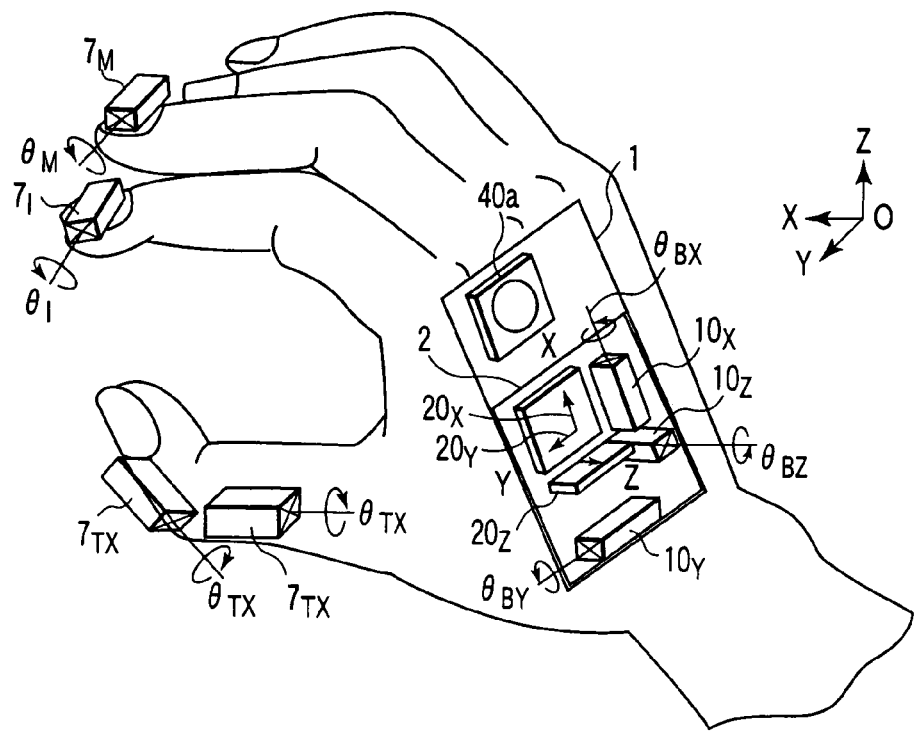

FIG. 2 shows the state in which a spatial sensor 1 including an inertia sensor group 2 for detecting a hand shape, a posture and a position, the above-described image pickup unit 40, and the like in a prior art is disposed onto a hand.

Note that the inertia sensor group 2 is a sensor group including triaxial angular velocity sensors 10X, 10Y, 10Z (hereinafter, called the angular velocity sensor 10) and triaxial acceleration sensors 20X, 20Y, 20Z (hereinafter, called the acceleration sensor 20) which are described above, in order to detect a position and a posture of a hand of an operator, and the movements thereof.

Accordingly, a rotational motion and a translation motion of the back of hand can be determined on the basis of information obtained from the acceleration sensor 20 and the angular velocity sensor 10. However, because the gravitational acceleration due to the gravity and the inertia acceleration due to an inertia motion are synthesized in the acceleration sensor 20, inertia acceleration information and gravitational acceleration information are separated by filtering an inclination component which is the gravitational acceleration, angular information obtained by time integral of an angular velocity of the angular velocity sensor 10, or the like.

Because the inertia acceleration information due to an inertia motion outputted from the acceleration sensor 20 which has been determined in this way is made to be zero when an object is moving at a constant speed or stopped, it is impossible to distinguish between the motion states thereof.

Moreover, an error due to drift or the like is brought about in the rotational posture information in space by the angular velocity sensor 10. Therefore, correction processing is carried out onto the rotational posture information by the angular velocity sensor 10 so as to make the gravitational acceleration of the acceleration sensor 20 be a reference. However, in this correction, the rotations around the gravitational axis cannot be corrected.

Then, in the present embodiment, in addition to the above-described inertia sensor group 2 for detecting a position and a posture of the back of hand, there are provided an optical system for projecting a peripheral image and an image sensor 40a serving as the image pickup unit 40 for detecting motion information in spatial hexaxial directions on the basis of the image. The image sensor 40a is disposed such that an optical axis direction is coincident with the Z coordinate axis direction of the back of hand, i.e., the direction vertical to the plane of the back of hand. Further, the lens of the image sensor 40a is a fisheye lens having an angle of view of 180°. However, the optical axis direction and the angle of view are not limited thereto.

Consequently, image of whole sky periphery at the side of the back of hand of a mounted person are simultaneously picked up, and a relative motion between the image sensor 40a and a peripheral object can be known by a movement of these images. Further, the image sensor 40a and the inertia sensor group 2 are fused together, whereby a posture and a position in space of the back of hand can be higher-precisely measured.

Here, from the standpoint of a motion detection apparatus, focusing on the configuration formed from the inertia sensor group 2 composed of the acceleration sensor 20 and the angular velocity sensor 10, and the image sensor 40a for acquiring a posture from the peripheral images, there is no need to consider a sensor group 7 at the fingertips.

The relationship between the posture frames of the respective sensors in the world coordinate space is shown in FIG. 3. Suppose that a sensor for detecting a position and a posture (pose) with respect to the world coordinate space {W} is a spatial (posture) sensor 1, and a frame which expresses the position and the posture desired to be determined is a spatial sensor frame {H}. The inertia sensor group 2 is configured on the spatial sensor 1. Here, in order to simplify the handling, suppose that the axis for detecting posture of the inertia sensor group 2 (inertia sensor frame) is coincident with the frame of the spatial sensor 1. Further, camera position and posture information obtained by the image sensor 40a is position and posture (pose) information of a camera sensor frame {C} with respect to the world coordinate space {W}. However, because it is organized on the spatial sensor frame, it can be always matched by a constant frame conversion matrix $\{_C R_H\}$.

The outline of incident rays and emergent rays of the optical system of the embodiment is shown at the upper portion of FIG. 4A.

This optical system is configured as an example of an equisolid angle projection lens by which an image height (y') on the image-formed plane with respect to an angle of incidence (θ) is made y'=2f·sin(θ/2), and is made to be an image in proportion to an apparent area of the object, i.e., the solid angle of the material body. However, a shape of the image varies to be flat as an angle of incidence increases. This optical system can be configured of an equidistance projection lens or in another system provided that it is a super wide angle fisheye lens and the like. The optical system is made such that the angle of field is 180°, and an image of whole sky periphery is projected on the image sensor 40a when the optical axis is directed to the zenith direction.

The incident rays are projected on the circumference of the concentric circle of the projected image shown at the lower portions of FIG. 4A with respect to the angles from the zenith, i.e., the angles (θ) with respect to the center of the optical axis on the basis of a projection relational expression of the optical system, and the projected position is changed to a position at which the diameter of the concentric circle is made larger as the angle increases (inclines in the horizontal direction). A ray whose incident angle is 90° is a ray from the horizontal line, and is to be projected onto the edge of the circumference. Further, the ray from the azimuth direction is projected on the line coincident with the azimuth of the center line of the circle of the projected image.

Accordingly, because the central position and the diameter of the circle on the projected image have been known, an angle of incidence and an azimuth of an incident ray can be determined if a two-dimensional coordinate position on the image sensor 40a is provided.

Figure 5A:
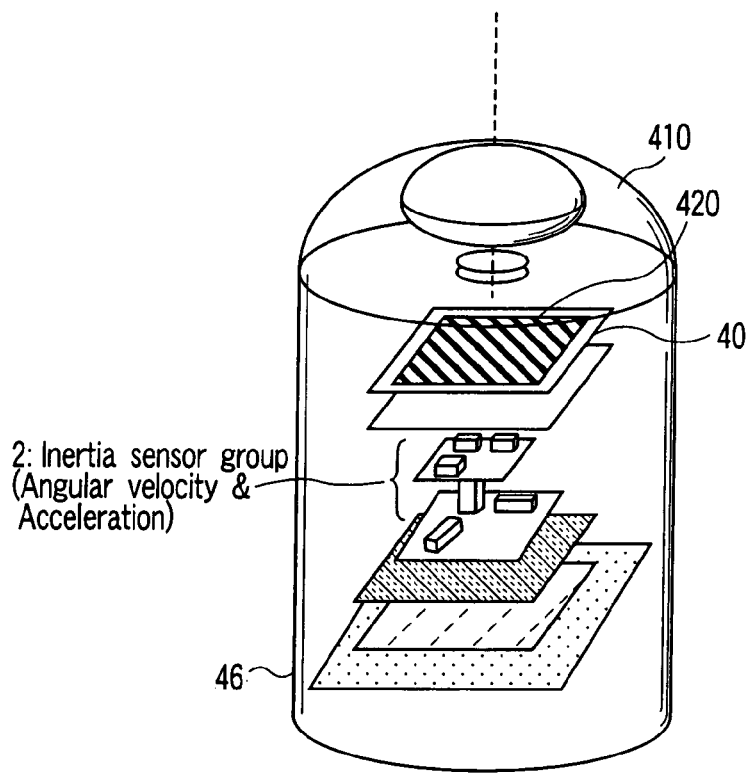
FIG. 5A is a block diagram of an optical system in the motion detection apparatus.
Figure 5B:
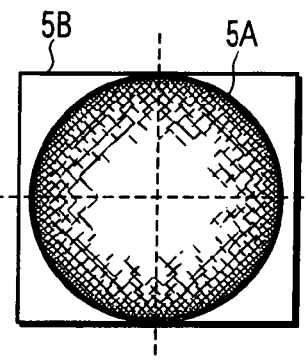
FIG. 5B is a diagram showing an image captured by the optical system of FIG. 5A.

The lower portion of FIG. 4A is a diagram in which the relationships of image heights and the relationships of azimuths with respect to angles of incident rays are expressed on the projected image. Further, FIG. 5A shows an example of another mounting form of a motion detection apparatus into which an image pickup system by the optical system and the inertia sensor group 2 are built. A super wide angle optical system lens 410 is installed at the upper portion of a cylindrical housing 46, and an image pickup device 420 is disposed beneath it so as to be the projection condition described above. In addition, this optical system is made to be an image formation system such as a pinhole camera, and an image focused from a near point to a far point is formed. Moreover, the inertia sensor group 2 including an angular velocity sensor and an acceleration sensor at the lower portion thereof is disposed so as to detect the spatial triaxial directions perpendicular to one another. Additionally, a processing system which processes these signals is built in, and it is configured such that this apparatus independently can detect a posture and a position in space. Note that a captured image by such an optical system is shown in FIG. 5B. Further, modified examples of other optical systems, and images captured by the optical systems are shown in FIGS. 6A, 6B, 7A, and 7B.

Figure 6A:
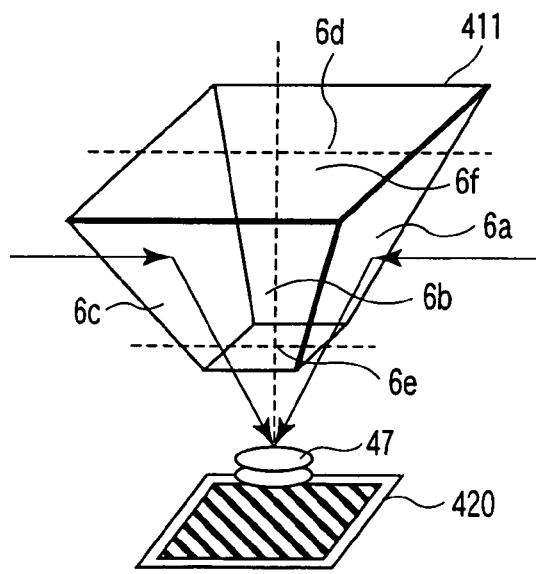
FIG. 6A is a block diagram of an optical system by a four-sided mirror system.
Figure 6B:
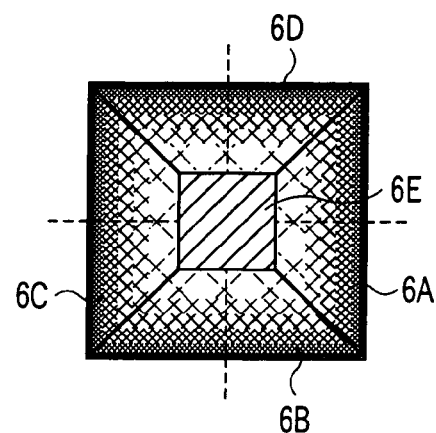
FIG. 6B is a diagram showing an image captured by the mirror system optical system.

FIG. 6A is an example of a configuration in which four plane mirrors 6a, 6b, 6c, and 6d are stuck onto the side surfaces of a rectangular pyramid 411. This rectangular pyramid 411 is a shape in which the vertex side is cut, and is disposed so as to be turned, and images reflected onto the plane mirrors 6a, 6b, 6c, and 6d are projected onto the image pickup device 420 through an imaging lens system 47. Further, both of a bottom surface 6f and a top surface 6e of the rectangular pyramid 411 are respectively clear or transmittable, and a peripheral image in the optical axis direction of the imaging lens system 47 is transmitted to be projected onto the image pickup device 420. Accordingly, images in a total of five axis directions of images 6A, 6B, 6C, and 6D in the four directions perpendicular to the optical axis of the lens and the optical axis direction 6E are simultaneously picked up. When the number of mirrors is further increased, it is possible to photograph images in more directions. Because this projected image by the optical system is the central projection divided into five regions, a direction of a spatial position of a feature point can be easily determined by a linear transformation expression of image information.

Figure 7A:
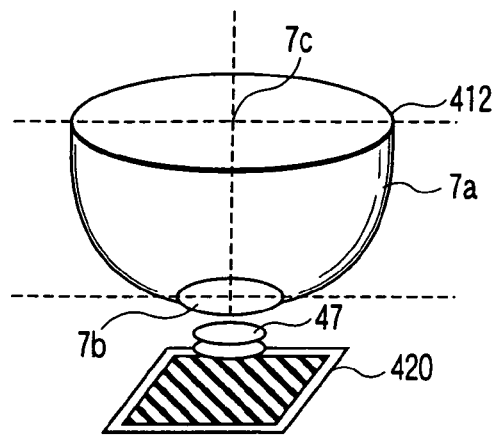
FIG. 7A is a block diagram of an optical system using a parabolic mirror.
Figure 7B:
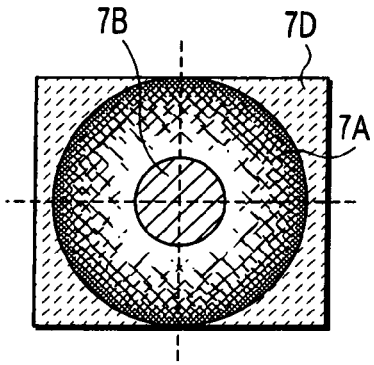
FIG. 7B is a diagram showing an image captured by the optical system using a parabolic mirror.

Next FIG. 7A is a modified example utilizing a parabolic mirror. A parabolic shape 412 whose outside is made to be mirror is disposed. A peripheral image reflected onto a parabolic mirror 7a is projected onto the image pickup device 420 through the imaging lens system 47. This parabolic shape 412 of FIG. 7A as well is made such that the vertex thereof is cut in the same way as described above. Both of a top surface 7c and a bottom surface 7b are clear or transmittable, and a peripheral image in the optical axis direction of the imaging lens system 47 is transmitted to be projected onto the image pickup device 420. Accordingly, images 7A in all directions perpendicular to the optical axis and an image 7B in the optical axis direction are simultaneously picked up as in FIG. 7B. Moreover, an image of the reflected image on the parabolic mirror 7a is made circular. However, an image 7D in the same direction as the transmitted image at the center is projected at the outside thereof. Therefore, more images can be simultaneously picked up than the plane mirror type described above.

Figure 8:
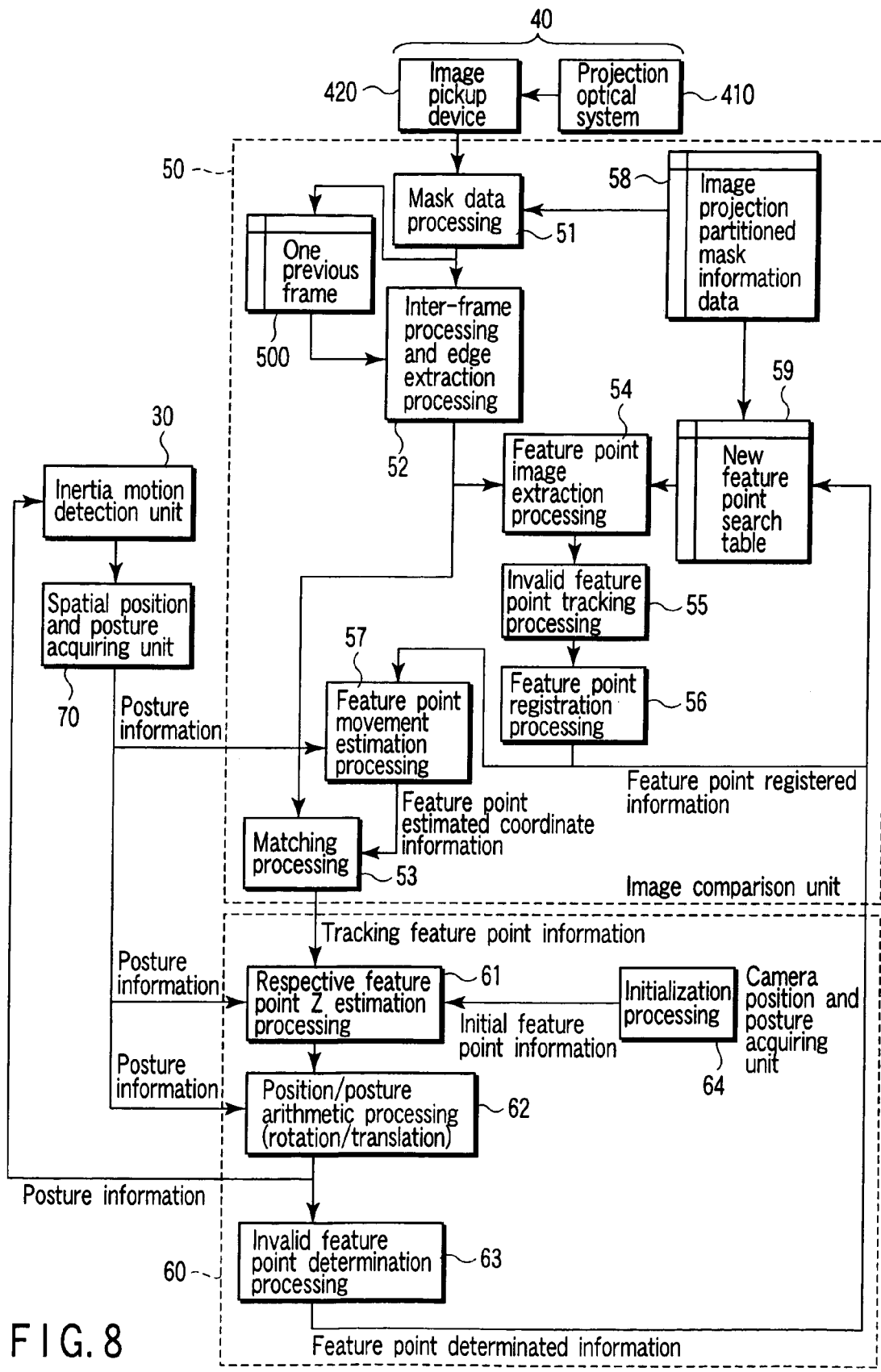
FIG. 8 is a block diagram for explanation of functional operations with respect to image processing in the motion detection apparatus according to the embodiment of the present invention.

FIG. 8 functionally shows the processings carried out at the interior of the image comparison unit 50 and the camera position and posture acquiring unit 60 of FIG. 1 described above. On the basis of this drawing, the flows of the image processings in the embodiment will be described.

An optical image is converted into an electric signal at the image pickup unit 40 via the projection optical system 410, and is further stored as image data. Next, this image data is inputted to the image comparison unit 50. However, because the peripheral image projected onto the image pickup unit 40 is made circular, there is no image data at the portion outside this circle. Therefore, in order to make an attempt to accelerate following image processings or the like, mask data which enable to distinguish as an invalid region is prepared in advance. FIG. 4B shows the mask data. Here, it is made to be the same size of data of an image sensor of 200×200 pixels. At this time, "0" data are written into portions where there are no data and an attempt is made to omit following image processings, and data other than "0" are written into the other portions. Here, the outside of the circle with a valid incident diameter centering round the coordinate position onto which the center of the optical axis is projected is "0" data.

First, mask data processing 51 is carried out on the basis of this data at the image comparison unit 50. After the mask data processing 51 has been carried out, processing between the peripheral image fetched as serial frame images and an image of one previous frame 500 is carried out, and moreover, edge extraction processing is carried out with respect to the processed image. In this edge extraction processing 52, edge extractions by differential operators in the x direction and the y direction (for example, Sobel operator) are carried out in order to determine the edge portions of the inputted image, and places where there are edges are searched in the both of x and y directions. The reason for this is that an attempt is made to reduce errors in matching processing 53 for feature point images to be described later.

After edges are extracted in the edge extraction processing 52, feature point image extraction processing 54 is carried out in order to determine a relative movement of the peripheral images from the image data. Here, in order to search an image to be a feature point, a feature point extraction is achieved due to a feature point being searched by sensing the edges of inputted images around a coordinate position determined in advance, and evaluating the points. Note that, in FIG. 4A, supposing that search start coordinate positions are black spots, and rectangular regions around those are searching ranges, feature point initial searched position information is defined. This is because an attempt is made to enable to register feature point information with data in many directions. This is because an attempt is made to enable to more correctly estimate a movement in space of the back of hand by comparing relative movements of the feature points in the front, rear, left, right, and up directions at the periphery. Note that the information, such as the feature point initial searched position information, which are used for feature point extraction are stored in a new feature point search table 59.

When feature points are extracted, feature point registration processing 56 is carried out after invalid feature point tracking processing 55 to be described later in detail. In the feature point registration processing 56, registered feature point coordinate (Uk, Vk), feature point images of given rectangular regions with the feature points being as the central positions, a transformation $\{_0H_k\}$ into a spatial sensor frame which is posture information with respect to the world coordinate space $\{W\}$ which has been already determined at the time of this registration, and an inverse transformation thereof $\{_kH_0\}$ are registered as new feature point information, and moreover, flags already registered are set.

Moreover, in the feature point registration processing 56, registration operations with respect to all the feature points which could extracted around the initial searched position in FIG. 4A are carried out. These registered feature point information are utilized for the matching processing 53 and the like in a frame image which will be inputted next.

Note that, in the first frame processing, i.e., the step of initialization, the next matching processing 53 is not carried out, and the processing in the image comparison unit 50 is completed. Moreover, an initialization processing 64 is carried out at the camera position and posture acquiring unit 60, and initialization processing for position/posture information is carried out. Then, the mask data processing 51, the inter-frame processing, and the edge extraction processing 52 in the same way as described above are carried out with respect to a frame image which will be inputted next.

Therefore, after the processing for the second frame on, flags already registered of the feature point information are examined. Here, when registered featured points, i.e., flags already registered are set, a portion having the highest correlation with the registered image is searched in the vicinity of the registered feature point coordinate (Uk, Vk) in a current frame. Here, when a correct position is found out, the position is stored as a current feature point coordinate, and a feature point search flag is set. When a correct position is not found out, the registered flag of the registered information and the feature point search flag are reset.

In the processing of searching a feature point image here, matching processing is carried out as the normal matching processing 53 while scanning the feature point image within a given range with respect to a registered feature point position. Then, as a result of the matching processing 53, supposed that a place having a highest relative value is a matching position, and this point is a feature point matching coordinate (U', V'). Moreover, when there is a determination on a relative value over a certain reference value, it is determined that the feature point could be correctly searched.

Figure 9A:
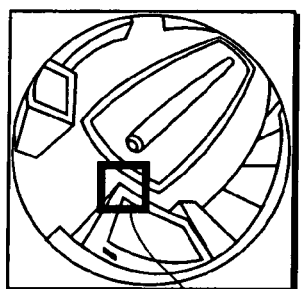
FIG. 9A is a view showing a state of a frame image fetched through an optical system, and of the extracted feature point image.
Figure 9B:
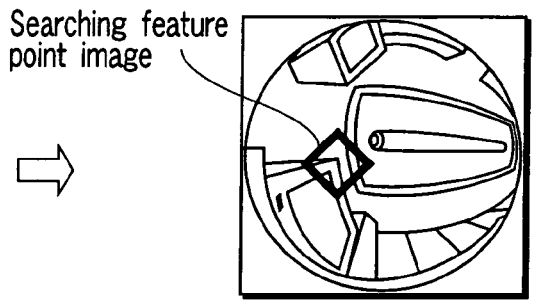
FIG. 9B is a view showing a state of the searching feature point image on the frame image fetched after the spatial sensor has moved so as to rotate.
Figure 10A:
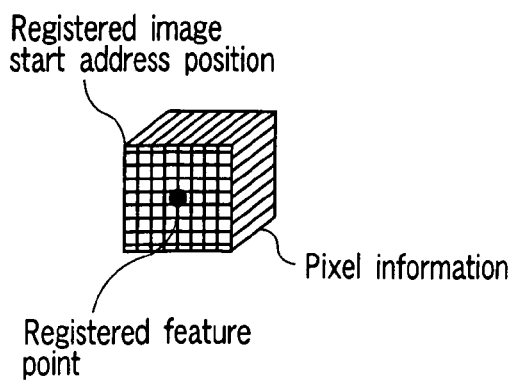
FIG. 10A is a conceptual illustration of data when registered feature point image information is registered in a memory.

FIG. 9A shows a state of a frame image fetched via the projection optical system 410, and of an extracted feature point image thereof in accordance with the present embodiment, and FIG. 9B shows a state of a searching feature point image on the fetched frame image after the spatial sensor 1 has rotated to moved. Further, FIG. 10A is a conceptual illustration of data when registered feature point image information thereof is registered in a memory. Here, the registered feature point image is 8-bit gradation data of 15×15 pixels. The central pixel (7, 7) coordinate values of this image data are data at a position of the feature point coordinate (Uk, Vk). On the memory, the data are usually managed as a successive data sequence with the pixel at the upper left being as a start address.

Figure 10B:
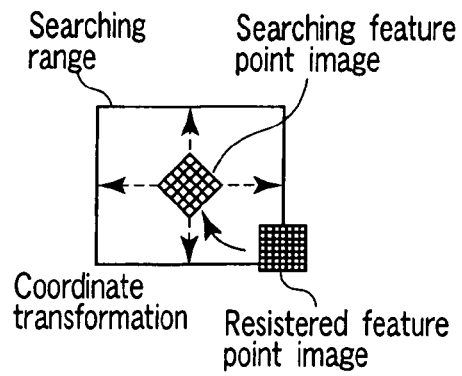
FIG. 10B is a view showing a state of feature point image data after the movement.

Then, the feature point image data which has moved as in FIG. 10B with respect to the inputted frame image is utilized in the matching processing 53. The image data of the registered feature point images which are a set of the image information are overlapped together, and a place where an integral value of absolute values of finite differences among respective pixels is smallest is searched. Therefore, in the correlation processing, it is necessary to add an address of an amount of parallel translation of a size of a searching region and a rotational operation by affine transformation to the feature point coordinate (Uk, Vk) which is the start address. Scanning in which the parallel translation and the rotational translation are combined must be achieved in order to search one feature point image, and extremely many calculation processings are required. Moreover, this must be carried out with respect to all the feature points to be registered, and an extremely high cost of calculation processing is required.

Then, in the embodiment, in order to calculate the position and posture of a current spatial sensor frame n which has been updated in this point in time (which means coordinate transformation into the current sensor frame n seen from the world coordinate system) $\{_0H_n\}$, it is estimated by utilizing an inverse transformation $\{_kH_0\}$ of $\{_0H_k\}$ which is a sensor frame k at a point in time when each feature point is registered, and a relative motion parameter $\{_kH_n\}$ which expresses the coordinate transformation from the time each feature point has been registered up to a current spatial sensor frame n, or $\{_nH_k\}$ which is an inverse transformation thereof. Mathematically, for example, provided that a coordinate value $(X_k, Y_k, Z_k)$ at a frame k corresponds to a coordinate value $(X_n, Y_n, Z_n)$ at a sensor frame n, this parameter is expressed by the coordinate transformation expressed by:

$$\begin{bmatrix} x_n \\ y_n \\ z_n \\ 1 \end{bmatrix} = {_nH_k} \begin{bmatrix} x_k \\ y_k \\ z_k \\ 1 \end{bmatrix} = \begin{bmatrix} {_nR_k} & {_nT_k} \\ 0 & 1 \end{bmatrix} \begin{bmatrix} x_k \\ y_k \\ z_k \\ 1 \end{bmatrix}$$

or

-continued $$\begin{bmatrix} x_n \\ y_n \\ z_n \end{bmatrix} = {}_nR_k \begin{bmatrix} x_k \\ y_k \\ z_k \end{bmatrix} + {}_nT_k = \begin{bmatrix} r_{11} & r_{12} & r_{13} \\ r_{21} & r_{22} & r_{23} \\ r_{31} & r_{32} & r_{33} \end{bmatrix} \begin{bmatrix} x_k \\ y_k \\ z_k \end{bmatrix} + \begin{bmatrix} t_x \\ t_y \\ t_z \end{bmatrix}$$

Here, ${}_nR_k$ is a rotational matrix, and denotes a 3×3 matrix with $r_{ij}$ (i=1, 2, 3; j=1, 2, 3) being as components. This matrix can be expressed by three independent parameters ($\phi_x$, $\phi_y$, $\phi_z$). On the other hand, ${}_nT_k$ expresses a translation vector, and can be expressed by three independent parameters ($t_x$, $t_y$, $t_z$). Namely, the position and posture relationship among the respective frames can be expressed by a total of six parameters, i.e., ($\phi_x$, $\phi_y$, $\phi_z$, $t_x$, $t_y$, $t_z$).

At this time, the position and posture relationship on the world coordinate system of a sensor frame n at the current point in time is estimated while utilizing a relational expression of ${}_0H_n = {}_0H_{kk}H_n$ or ${}_nH_0 = {}_nH_{kk}H_0$.

Next, coordinate values in a current frame image on the registered feature point coordinate (Uk, Vk) are estimated on the basis of the motion parameters and the relational expression of the projection optical system. By searching around feature point movement estimated coordinate (Uprd, Vprd) obtained by a feature point movement estimation processing 57, a searching region can be narrowed, and the cost of calculation processing can be reduced.

In the management of actual feature point image data, if it is the management of only pixel information as in FIG. 10A, a parallel translation position or a moved position due to rotation or the like must be estimated for each pixel by projective transformation every image data scanning at the time of the matching processing 53, and the processings are made complicated.

Figure 11A:
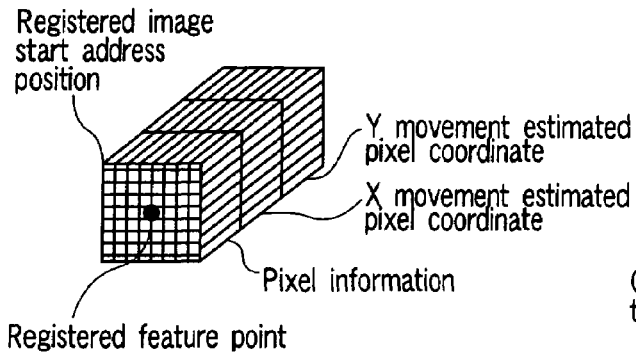
FIGS. 11A and 11B are examples of registered feature point images in the embodiment of the invention.

Accordingly, in practice, as in FIG. 11A, an XY movement estimated pixel coordinate regions for corresponding X coordinate and Y coordinate are insured for each pixel data at the time of registration. Next, before the matching processing 53 for searching feature point, a movement estimated position for each pixel of each feature point image by a relative motion parameter $\{{}_nH_k\}$ is calculated, and the data of the calculated movement estimated position is recorded at the XY movement estimated pixel coordinate regions of a corresponding pixel. This processing is carried out in advance with respect to all the pixel data in all the feature point images which have been already registered.

Then, in the matching processing 53 thereafter, the processing is possible by only an operation of adding a parallel translation amount for scanning image data to the XY coordinate data of the feature point image data, and the entire processing is simplified.

Figure 11B:
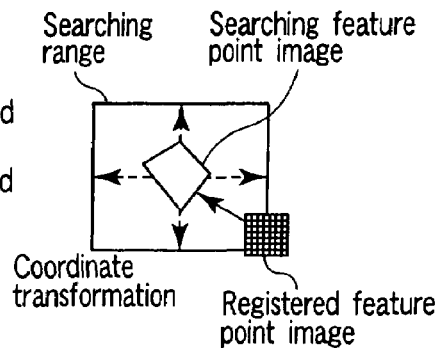

FIG. 11B is a diagram showing the state in which a position and a region of a feature point image at the time of registration are moved to a position by the XY movement estimated pixel coordinates estimated in advance. The feature point image onto which the coordinate transformation has been achieved in this way is not an original rectangular image shape, and there are cases in which the feature point image is deformed by projective transformation. However, with respect to image data having such a shape as well, in the matching processing 53, it is sufficient that processing for only adding and subtracting operations such as a calculation of a movement of an address and a relative value are merely carried out.

Next, another modified example with respect to the matching processing 53 will be described.

In tracking feature point, there are cases in which an attempt is made to track a shape of a thing to be an object as is. For example, an object in front of a material body whose background greatly moves, a case where a region varying in an object exists, and the like can be thought. In a case where there is such an image component varying in a feature point image obtained from a feature point, there are cases in which matching cannot be achieved if it is carried out by a conventional method.

Figure 12A:
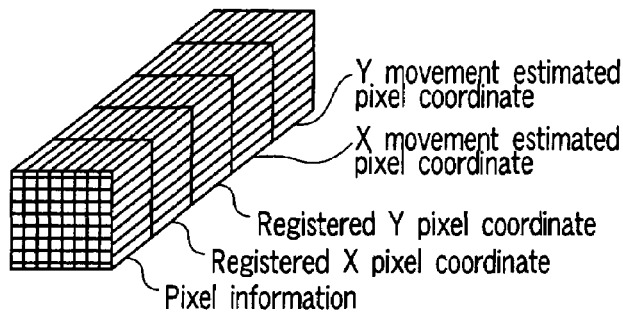
FIGS. 12A and 12B are examples of registered feature point images in another embodiment of the present invention.

Then, as in FIG. 12A, in addition to the XY movement estimated pixel coordinate region described above, a registered XY pixel coordinate region is provided. In the example described above, in order to determine coordinate values at the time of registration of each pixel on the basis of the registered feature point coordinate (Uk, Vk), it is supposed that the pixel data of the registered feature point image is data of a vertically and horizontally fixed rectangular region centering round the feature point.

Accordingly, coordinate values for each pixel have been determined from the vertical and horizontal values of the rectangular region, and thereafter, estimated coordinate values for searching have been determined on the basis of a transformation expression of projective transformation with respect to the coordinate value. However, in this modified example, it is sufficient that projective transformation is directly carried out with respect to the registered pixel coordinate data in an address translation as well, and a result thereof is merely registered with the movement estimated pixel coordinates.

Moreover, because the coordinate values of the registered pixel position can be registered, there is no need to limit the shape to a rectangle, and a feature point image having any shape can be registered. Even processing having a complicated shape which seems to be complicated at first glance can be executed by repeating simple processings.

Accordingly, for example, with respect to a monitor on which a projected image is displayed, only the frame of the monitor can be registered as a feature point image region, and the matching processing 53 can be achieved independently of the contents of the projected image.

Figure 12B:
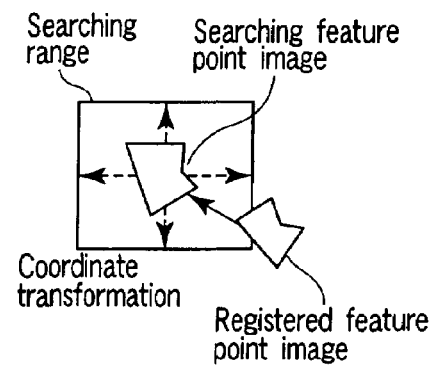

FIG. 12B shows the state in which a feature point image at the time of registration, and moved positions and rotations of the feature point image for searching in the above modified example are estimated. In this way, a registered feature point image as well is not necessarily a rectangle, and moreover, even if the original shape of the searching feature point image to be estimated is changed, it can be carried out only by simple calculations in matching processing. The current spatial sensor frame $\{{}_nH_0\}$ information used for estimating moved positions up to now is calculated by the inverse transformation $\{{}_nH_0\}$ of $\{{}_0H_n\}$ that updating of frame information by the inertia sensor group 2 up to at that point in time is processed at the spatial position and posture acquiring unit 70. However, the updating by the image pickup device 420 is information to which the result determined by the one previous processing is reflected. Accordingly, there is possibility that errors due to drift of the inertia sensor or the like are accumulated. An error generated between update rates by the image pickup device 420 is an extremely small value.

Current camera position and posture information $\{{}_nC_0\}$ is determined by the camera position and posture acquiring unit 60 on the basis of the feature point information obtained by the processings on and after. Here, in the camera position and posture acquiring unit 60, it is formulated supposing that the movement of the world coordinate system (relative motion) centering round the camera coordinate system is tracked. Provided that the position and posture $\{{}_nH_0\}$ of the world coordinate system with respect to the camera coordinate system is calculated once, the position and posture $\{_0H_n\}$ of the camera coordinate system (i.e., the spatial sensor system) with respect to the world coordinate system can be easily determined as an inverse matrix (inverse transformation) thereof.

Here, as in FIG. 3, because the camera frame is organized on the spatial sensor 1 which is a spatial sensor frame, it can be always converted into a camera frame $\{C\}$ by adding a given transformation matrix $\{_cR_H\}$ to the spatial sensor frame $\{H\}$. Accordingly, here, in order to simplify the description, it will be described supposing that the camera frame $\{C\}$ and the spatial sensor frame $\{H\}$ are coincident with one another. Here, n is a number of a frame to be determined, 0 is a first frame, and k is a frame number when a feature point has been registered. As described above, the initialization processing 64 is carried out at the first frame 0. Further, the spatial sensor frame at this time is made to be n=0. Namely, it is in a state in which $\{_0H_0\}$ and $\{_0H_w\}$ are coincident with each other, i.e., the spatial sensor frame $\{H\}$ and the world coordinate space $\{W\}$ are coincident with each other. At this time of initialization, with respect to the feature point obtained from the image pickup device 420, a feature point position in which the depth information z is known is registered. Note that, here, this depth information z shows depth information with respect to the sensor frame system. In addition, the initialization processing 64 will be further described later. In accordance therewith, the following description will be carried out supposing that $\{_nC_0\}$ and $\{_nH_0\}$ are equivalent to each other.

Figure 13:
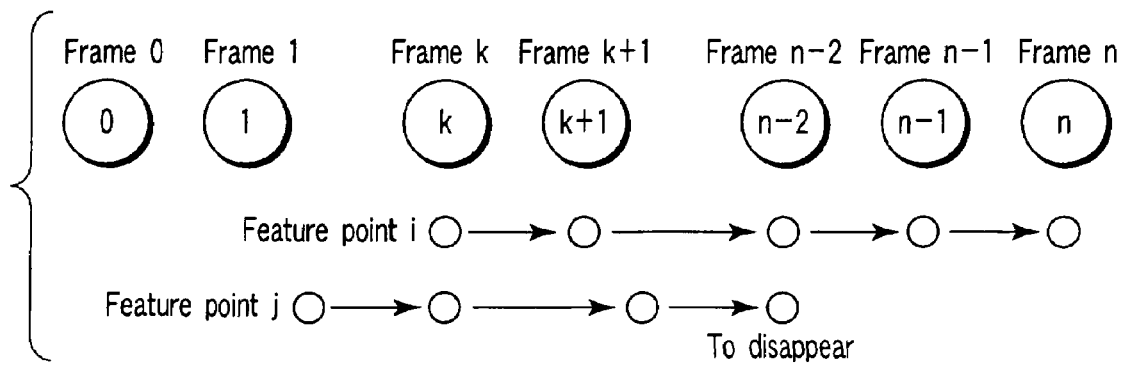
FIG. 13 is an image diagram with respect to behaviors of feature points on serial frame images.

The state from a time when feature points appear and up to a time when those disappear in a stream of a plurality of images is shown in FIG. 13.

Figure 14:
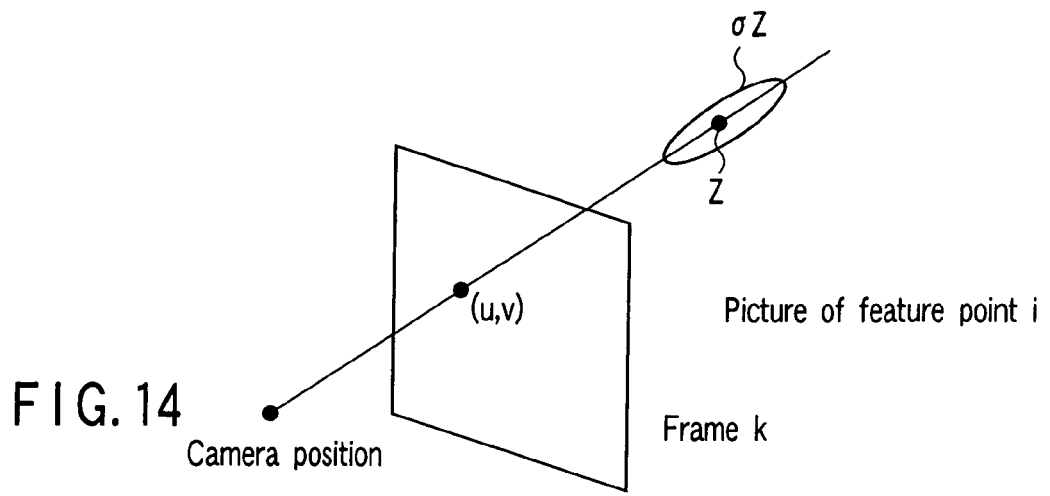
FIG. 14 is an image diagram with respect to an image position, depth information, and uncertainties of a camera frame of a feature point image obtained by an image sensor.

A feature point i has appeared at a frame image k for the first time, and further, a feature point j has disappeared at a frame image (n−2). The matching processing 53 and the feature point registration processing 56 described above are carried out for each of these frame images. From a point in time when a feature point is registered for the first time, feature point coordinate (u, v) and depth information z are used as related parameters with this feature point. At this time, a maximum value is allocated to an uncertainty $\sigma_z$ with respect to the depth information z. The feature point coordinate (u, v) and the depth information z are shown in FIG. 14.

Figure 15:
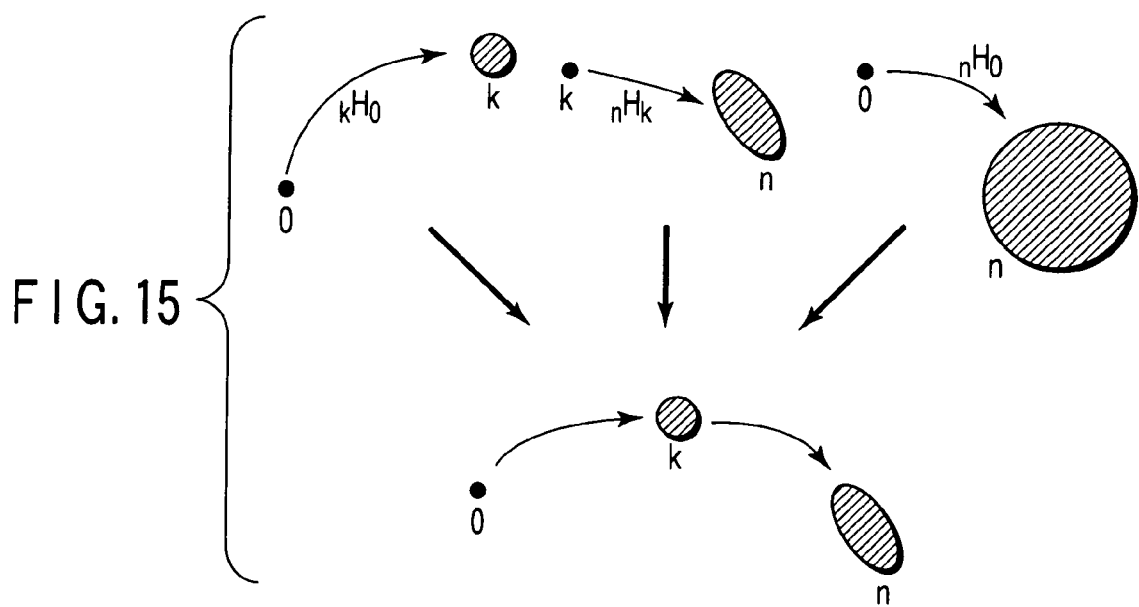
FIG. 15 is an image view showing a state in which an error between posture information and depth information associated with the feature point information is gradually made smaller by repeating matching processing for a feature point.
Figure 16:
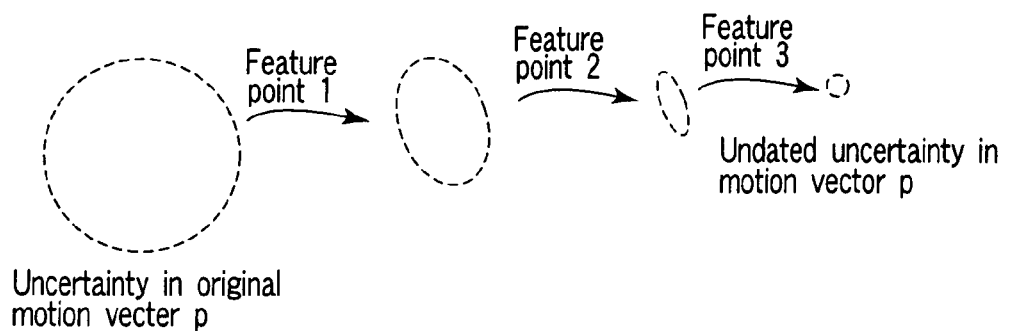
FIG. 16 is an image diagram of a state in which uncertainties of a motion vector are gradually made smaller.

When matching with respect to the feature point is correctly taken in a new frame image, a current spatial sensor frame $\{_nH_0\}$ is updated by utilizing estimated values of rotational and translation information from a camera frame $\{_kC_0\}$ when the feature point was registered for the first time (namely, which is equivalent to $\{_kH_0\}$). A transformation from frame k to frame n, i.e., $$\{_nH_k\}:p=(^n\phi_x^k,^n\phi_y^k,^n\phi_z^k,^nt_x^k,^nt_y^k,^nt_z^k)$$

and, uncertainties $\sigma_z$ in association therewith are updated for the first time, and thereafter, a transformation from frame 0 up to frame n, and uncertainties $\sigma_z$ in association therewith are updated by using a relational expression $_nH_0=_nH_{kk}H_0$ among frame 0, frame k, and frame n. Here, p denotes a motion vector. Image diagrams of the states are shown in FIGS. 15 and 16. Note that $\{_kH_0\}$ is a known value because $\{_kH_0\}$ has been transformed and updated in the processings up to now.

Next, the depth information z of the feature point image can be updated due to the uncertainties $\sigma_z$ in association with $\{_nH_0\}$ being successively updated. This is carried out due to a first rerun of $\{_nH_k\}$ for the image of the feature point i obtained by calculating $\{_nH_k\}=_nH_{00}H_k$, and due to (U, V) which is a correspondence relationship between frame k and frame n and the depth information z based on (u', v') being updated. This newly determined z is used for estimating a next frame transformation as well. Note that the contents of the respective feature point information are expressed as follows.

1) A frame number k when a feature point appears for the first time and is registered.

2) Standardized feature point coordinate (u, v) in frame k.

3) Depth information z defined in frame k (a shape vector component in association with (u, v))

$$\{_kH_0\} \equiv {_kH_0}(_kR_0,{_kT_0})$$
$$\equiv {_kH_0}(^k\phi_x^0,{^k\phi_y^0},{^k\phi_z^0},{^kt_x^0},{^kt_y^0},{^kt_z^0})$$

(motion parameter) (which has been already calculated in the frame at the time of registration)

5) One previous spatial sensor frame $\{_{n-1}H_0\}$ (which has been already calculated in the previous frame)

6) Standardized feature point coordinate $(u_{prev}, v_{prev})$ in one previous frame (n−1)

7) Covariance matrix $\text{cov}(u_{prev}, v_{prev})$ in one previous frame (n−1)

In a new frame image, the parameters described above are made to associate with the respective feature points with the respective feature points being as markers.

Figure 17:
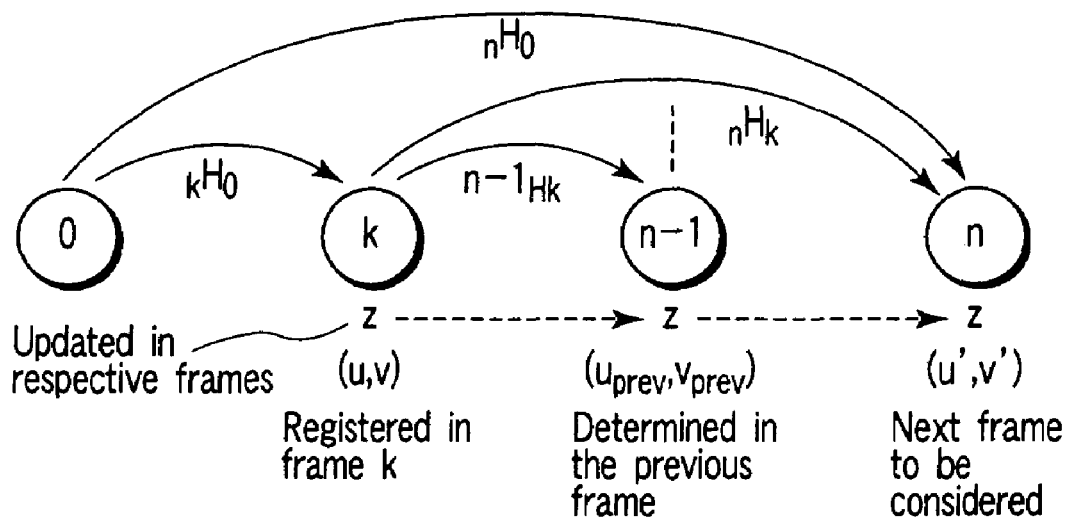
FIG. 17 is a relational view among spatial posture information k at the time of registration, one previous posture information (n−1), and posture information n that an attempt is made to obtain of a certain feature point.

Here, the following processings are carried out in order to determine the depth information z described above, $\{_nH_k\}$, and other values. Further, the relationship among the respective frames is shown in FIG. 17.

Note that it is assumed that the motion parameters up to the previous frame have been evaluated at this point in time. Moreover, it is assumed that $\{_kH_0\}$ and $\{_{n-1}H_k\}$ have been already evaluated with an average value and a covariance matrix. Further, $$_nH_{n-1}(^n\phi_x^{n-1},^n\phi_y^{n-1},^n\phi_z^{n-1},^nt_x^{n-1},^nt_y^{n-1},^nt_z^{n-1})$$

are estimated in consideration of the uncertainties. In accordance therewith, because an estimated value $\{_nH_{n-1}\}$ is provided, $\{_nH_0\}$ can be also estimated.

Next, matching for feature points which have been already registered in a feature point list in frame (n−1) is carried out. Note that, in FIG. 17, k is a frame number whose feature point appeared for the first time, and (u', v') is a coordinate value of the feature point in frame n. Then, cov(u', v') is a covariance matrix in frame n.

1) $_nH_k(^n\phi_x^k,^n\phi_y^k,^n\phi_z^k,^nt_x^k,^nt_y^k,^nt_z^k)$ is predicted as follows.

$$\{_nH_k\}=_nH_{n-1\ n-1}H_k, r_{ij}\in\{_nH_k\} \quad \text{(Formula 1)}$$

2) In order to update $\{_nH_k\}$, the following constraints are provided.

$$u' = \frac{z(r_{11}u+r_{12}v+r_{13})+^nt_x^k}{z(r_{31}u+r_{32}v+r_{33})+^nt_z^k} \quad \text{(Formula 2)}$$

$$v' = \frac{z(r_{21}u+r_{22}v+r_{23})+^nt_y^k}{z(r_{31}u+r_{32}v+r_{33})+^nt_z^k}$$

Here, (u', v') is a measured value in frame n, and have small uncertainties with respect to an average value and a covariance matrix.

Further, an initial calculated value of a motion vector $p=({}^n\phi_x^k, {}^n\phi_y^k, {}^n\phi_z^k, {}^n t_x^k, {}^n t_y^k, {}^n t_z^k)$, the feature point coordinate (u', v'), and depth information z are obtained.

Then, by using a Kalman filter, the motion vector $p=({}^n\phi_x^k, {}^n\phi_y^k, {}^n\phi_z^k, {}^n t_x^k, {}^n t_y^k, {}^n t_z^k)$, and the depth information z are updated. Here, suppose that $\bar{p}=({}^n\bar{\phi}_x^k, {}^n\bar{\phi}_y^k, {}^n\bar{\phi}_z^k, {}^n\bar{t}_x^k, {}^n\bar{t}_y^k, {}^n\bar{t}_z^k)$ and $\bar{z}$ are an updated average value and an updated covariance.

In this way, $\{{}_n H_k\}$ is updated.

Next, updating of $\{{}_n H_0\}$ is carried out. Provided that updating of $\{{}_n H_k\}$ can be obtained in these processings, $\{{}_n H_0\}$ can be updated by using a Kalman filter again.

Moreover, ${}_n H_0 = {}_n H_{kk} H_0$ is considered on the basis of the measurements of $\{{}_n H_k\}$ and $\{{}_n H_0\}$, and a parameter $\{{}_n H_0\}$ calculated by a Kalman filter. Therefore, those are made:

$$a=({}^n\phi_x^k, {}^n\phi_y^k, {}^n\phi_z^k, {}^n t_x^k, {}^n t_y^k, {}^n t_z^k)$$

$$b=({}^k\phi_x^0, {}^k\phi_y^0, {}^k\phi_z^0, {}^k t_x^0, {}^k t_y^0, {}^k t_z^0)$$

$$c=({}^n\phi_x^0, {}^n\phi_y^0, {}^n\phi_z^0, {}^n t_x^0, {}^n t_y^0, {}^n t_z^0)$$

and at that time, cov(a) and cov(b) are extremely small values. Moreover, as a three-dimensional formula, the following (Formula 3) is provided.

$$f(a, b, p)=0 \quad \text{(Formula 3)}$$

Figure 18:
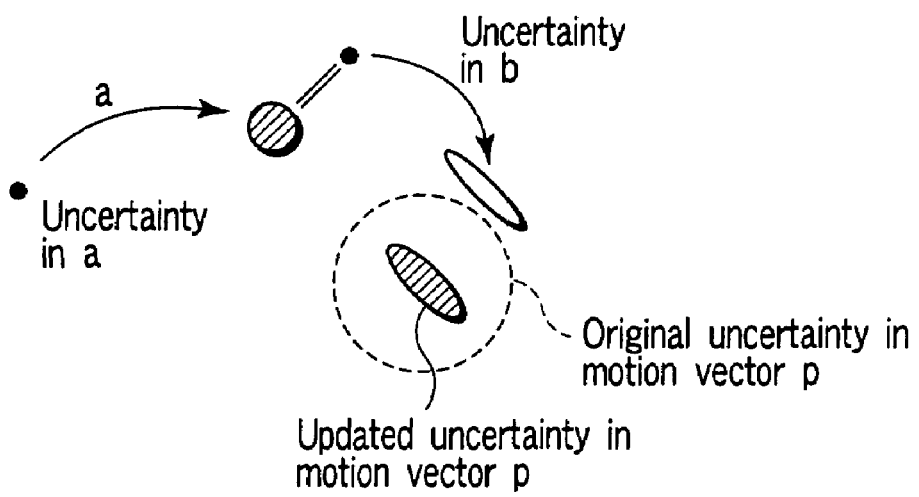
FIG. 18 is a view showing a relationship among the uncertainties of motion vectors.

Here, a, b, p, and 0 in (Formula 3) are a vector amount. In order to update p, a Kalman filter is used. The state of p after updating is shown in FIG. 18.

Accordingly, by respective feature point images and the Kalman filter, $$p=({}^n\phi_x^0, {}^n\phi_y^0, {}^n\phi_z^0, {}^n t_x^0, {}^n t_y^0, {}^n t_z^0) \in \{{}_n H_0\}$$

can be updated. Further, provided that the Kalman filer can be successively applied to p, the uncertainties of p can be reduced to an extremely large extent.

Next, the depth information z defined in frame k is estimated. From this, the Kalman filer is successively applied to only the motion vector p. Then, by applying the Kalman filter again after updating p, the uncertainties $\sigma_z$ of z can be reduced. This is achieved by the following method. After calculating $p=({}^n\phi_x^0, {}^n\phi_y^0, {}^n\phi_z^0, {}^n t_x^0, {}^n t_y^0, {}^n t_z^0) \in \{{}_n H_k\}$ is formulated again by using the following (Formula 4):

$$\{{}_n H_k\}={}_n H_{00} H_k = {}_n H_0 ({}_k H_0)^{-1} \quad \text{(Formula 4)}$$

First, the uncertainties are propagated by using the following formula.

$$\text{Measurement} \begin{matrix} ({}^n\phi_x^0, {}^n\phi_y^0, {}^n\phi_z^0, {}^n t_x^0, {}^n t_y^0, {}^n t_z^0) \in \{{}_n H_0\} \\ ({}^k\phi_x^0, {}^k\phi_y^0, {}^k\phi_z^0, {}^k t_x^0, {}^k t_y^0, {}^k t_z^0) \in \{{}_k H_0\} \end{matrix}$$

In the both formulas, extremely small uncertainties corresponding to $\{{}_n H_k\}$ must be delivered in accordance with an individual feature point. Then, the above-described (Formula 4) is considered.

Then, $$c=({}^n\phi_x^k, {}^n\phi_y^k, {}^n\phi_z^k, {}^n t_x^k, {}^n t_y^k, {}^n t_z^k) \in \{{}_n H_k\}$$

and an evaluated value of the covariance are obtained. Here, (u', v') having frame k for being matched to the depth information z of frame n is defined by the above-described (Formula 2).

(u', v') and $c=({}^n\phi_x^k, {}^n\phi_y^k, {}^n\phi_z^k, {}^n t_x^k, {}^n t_y^k, {}^n t_z^k) \in \{{}_n H_k\}$ are made to be in non-correlation with all the measured values (or, values already evaluated). Note that it goes without saying that the depth information z is calculated.

After calculating all the values in frame n, $c=({}^n\phi_x^k, {}^n\phi_y^k, {}^n\phi_z^k, {}^n t_x^k, {}^n t_y^k, {}^n t_z^k) \in \{{}_n H_k\}$, the depth information z, and other values are updated.

As described above, when a relationship $\{{}_n H_0\}$ of the position and posture of the initial frame 0 based on frame n denoting a current state is estimated (updated), the position and posture $\{{}_0 H_n\}$ of a current frame based on the world coordinate system is calculated as an inverse matrix (inverse transformation) thereof.

Namely, $${}_0 H_n = ({}_n H_0)^{-1}$$

Provided that the position and posture $\{{}_n H_0\}$ (i.e., $\{{}_n C_0\}$) of the world coordinate system with respect to the camera coordinate system is calculated in this way, the position and posture $\{{}_0 H_n\}$ of the camera coordinate system (i.e., spatial sensor system) with respect to the world coordinate system can be easily determined as an inverse matrix (inverse transformation) thereof.

Here, in the camera position and posture acquiring unit 60 described above, the initialization processing 64 in the initial frame 0 will be described.

The camera position and posture acquiring unit 60 continues to track feature point information during the time when a feature point appears and disappears, and continues to update the three-dimensional information of the feature point. Moreover, when another feature point appears, it is possible to continue to update the camera frame information by taking over the three-dimensional information of the current feature point information. However, at a point in time when the spatial sensor is started for the first time, no feature point has three-dimensional information, and therefore, the respective feature points can acquire only the relative depth information. Accordingly, in this initialization processing 64, processing in which depth information is provided to one or more known feature point is carried out. First, a first system of the initialization processing will be described.

Note that, in a case of utilizing the motion detection apparatus of the present embodiment as means for detecting a body motion, a known sized identification mark is attached to a portion where at least one part of the body of a mounted person himself/herself can be seen from the motion detection apparatus attached onto a hand, the head, or the like. The identification marks may be made to be, for example, feature point marks separated away at a certain known interval, or may be made to be identification marks having certain known sized shapes.

For example, in a state of power-on reset processing after inputting a power source, a forcible reset processing by a reset switch, and the like, the initialization processing 64 is carried out. The mounted person carries out the initialization processing 64 at a position where the identification marks are inputted to the image sensor 40a.

Further, in a case of utilizing a gesture operation input apparatus which can recognize a shape of hand and the like as shown in FIG. 2, the processing can be carried out by a reset gesture motion (for example, a motion when the shape of hand is changed from rock to paper is defined to be a reset operation). At the time of the initialization processing 64, the image sensor 40a detects these identification marks first, and initially registers the depth information z of a feature point extracted from the identification marks from the known sizes.

On and after this initialization processing 64, at the camera position and posture acquiring unit 60, it is possible to continue to update the camera frame while making the registered depth information z correspond to the other feature point information.

Accordingly, there is no need to carry out it at specific places with special marks at the time of initialization, and initialization processing can be carried out anytime and anywhere.

Further, as a second system of initialization processing, identification marks are attached onto one part of the body of a mounted person himself/herself in the same way as the first system of initialization processing described above. However, there is a system in which information such as a size, an interval, and the like are not necessarily required. This system is to carry out initialization processing such that a pose of the body (for example, the position/posture of a hand, the position/posture of the head, and the like) is determined in advance. For example, a pendant or the like serving as an identification mark is attached to the breast. Next, a reset gesture motion is carried out at the position of the pendant by utilizing the gesture operation input apparatus described above. In this initialization processing, the image sensor 40a on the back of hand recognizes a feature point at an image input region determined in advance, and registers the depth information z thereof as a known value. Accordingly, it is necessary for the mounted person himself/herself to measure in advance a pose for initialization and a distance from the image sensor 40a to a known feature point at that time, and to input the value as an initial value. In accordance with such a system, because it is sufficient that a position of the feature point can be recognized, there is no need to recognize a size, a distance, a shape, and the like of the feature point, and the identification mark can be made small.

Moreover, a third system of identification processing is a system in which measurements and positional relationship of the body itself are utilized as known feature points without mounting special identification marks onto a body. There are two types of systems as this in the same way as the system described above.

One system is a system in which measurements of a portion serving as an initial feature point of a body of a mounted person himself/herself are measured in advance, and are initially registered. For example, when eyes in the face are set as feature points, a distance of the width of the eyes is utilized as a known distance. Further, a width of the face, a shoulder length, and the like may be utilized as a known distance.

Moreover, the other system is a system in which initialization processing is carried out with a pose of a body determined in advance, a feature point position of one part of the body is always extracted from an constant distance, and the feature point position is inputted to the image sensor 40a. For example, in an initialization motion when a hand is stretched out in front of the body, a distance of the head is registered as a known distance, or a gesture for measuring a distance from one hand to the other hand is made to be an initialization pose while the both hands are opened at a given interval, whereby a known distance can be registered.

In a case of carrying out this by the gesture operation input apparatus described above, a reset gesture motion is carried out at a determined position in front of the body. In accordance therewith, the image sensor 40a on the back of hand can extract an image of the face within a region of an azimuth and an angle of incidence always within a given range, and the feature point thereof can be registered as known feature point information. In this system, a searching range of a known feature point at the time of initialization processing can be limited.

Further, the both systems can be naturally united into a method, and the accuracy can be improved by initially registering a known interval and known distance information of a feature point.

In accordance with the third system, initialization processing can be carried out without mounting special marks serving as feature points onto a body, and moreover, the operability thereof can be improved.

A fourth system of initialization processing is a system utilizing a relationship between a peripheral environment and a posture at the time of initialization. When this is carried out by the gesture operation input apparatus described above, a posture at the time of a reset gesture motion is decided in advance to carry out, for example, in a state of standing up and a state in which the back of hand is directed downward, or in a posture of hand such that information at the feet can be seen from the image sensor 40a. Moreover, a distance from the back of hand to the floor in this posture is measured in advance and initially registered. At this time, a feature point extracted from the image in the direction to the feet can be registered as substantially a feature point of the known distance information.

In a case of a motion detection apparatus attached to a head portion or the like, for example, stature data in a standing-up state can be utilized as distance information. However, also with respect to a change in the peripheral image due to flexing of a neck or the like, an image in the direction to the feet can be detected on the basis of information of the acceleration sensor 20 in the spatial sensor, and therefore, a feature point serving as the image information at the feet can be always distinguished. Therefore, a distance up to the feature point can be estimated on the basis of the angular information from the head to the feature point at the feet with respect to the gravity axis, and a distance from the spatial sensor to the feet. Accordingly, not only at the time of initialization processing, it can be utilized as a feature point by which the depth information can be always known. Note that, in this case, the condition is that it is utilized in a restricted environment in which the feet are opened to some extent.

Next, a fifth system of initialization processing is a system in which initialization processing is carried out by performing a motion such as a gesture of carrying out a known movement in advance as an initialization motion.

For example, in a case of carrying out it by the gesture operation input apparatus described above, as initialization processing, first, initialization processing is started with an initialization start gesture motion (for example, suppose that a stone and paper motion is a start motion). Then, a hand is moved from an initial position to an end position set in advance, and here, the input of initialization information is completed by carrying out an initialization end gesture motion (for example, suppose that a paper and stone motion is an end motion). As this motion, it is important that the straight distance connecting the first and last motions is always constant, and a known distance. For example, a distance moved by a series of motions from a state in which a hand is stretched out forward at the maximum up to the time the hand reaches the body can be utilized as substantially constant distant information.

The depth information of the respective feature points can be registered by adding known moved distance information to the motion parameters and depth estimated information of the feature point information from the peripheral image processed between the start and the end of the series of initialization gesture motion described above. This system is not a system in which the measurements and the positional relationship information of a body are directly utilized, but a system in which information on a motion range of an operating portion of the body is utilized.

As described above, in the initialization processing 64, initial registration of the depth information z with respect to an initial feature point is possible in the various systems. These can be separately used, and can be simultaneously carried out so as to be respectively combined. Further, an initialization system to be used can be changed by a gesture motion at a point in time of initialization.

Next, a method for searching a new start position for searching feature point will be described. When a registered feature point image cannot be searched in the matching processing 53, the information is discarded. However, when the number of feature points is made little, an amount of information for determining camera posture parameters is reduced, and the arithmetic accuracy deteriorates. Further, as described above, as the directions of an inputted image of a feature point, an attempt is made to input the image from as all directions as possible, which improves an accuracy of posture information. Accordingly, when it is discarded in a case where it is determined that matching for feature point cannot be taken, it is necessary to newly search a feature point and register it. Moreover, it is necessary that the input direction of an image of the feature point is a direction different from the input direction of the feature point image which has been currently registered and tracked.

Then, from this time forth, a table organizing technique for searching a feature point will be described with reference to FIG. 4B. FIG. 4B is image projection partitioned mask data in which mask data used for the mask data processing 51 described above is extended. Portions at the periphery on which an attempt is made to omit image processing and the like are "0" data, and numeric information other than "0" are embedded into the inside of the circle of the projection image. Numeric data are further embedded into every certain partitioned region, and the directions of the inputted image of a feature point currently on the search are distinguished on the basis of the data.

Here, there are two concentric circles in the inside of the circle, and the respective concentric circles are partitioned into several regions divided in the azimuth directions. Partitioned data serving as numbers for identifying the respective regions are embedded into these regions. Further, search start coordinate values which are start positions for newly searching a feature point are linked with the identification numbers. The search start coordinate values are the positions of the black spots drawn at substantially the centers of the respective image projection partitioned mask data regions of FIG. 4B. Note that the partitioned data correspond to the image projection partitioned mask data 58 of FIG. 8.

Namely, when matching for a current feature point position has been correctly searched in the matching processing 53, the substantial incident directions can be known by reading the partitioned data of the image projection partitioned mask data 58 corresponding to the tracked coordinate values. However, there is no need to particularly know the angles of the incident directions and the like. This processing may be carried out with respect to the search coordinate values of all the feature points already registered, partition numbers in which there are no feature point currently on the search may be determined, and the search start coordinate values of the partition numbers may be registered with a new feature point search table for searching. Consequently, the incident directions of the image which are the new searching feature point coordinate values can be dispersed.

It is possible to actually determine these processings by calculations. At that time, however, the angles of incident rays ($\theta$) and azimuths at the respective feature points are determined by transformation expression of projective transformation on the basis of the current feature point image coordinates, the incident directions of all the feature points are analyzed, and thereafter, a direction to search next must be determined. A larger number of complicated processings are required for the transformation processing and the analyses of the incident directions, and the like. In contrast thereto, in the embodiment, the number and the directions of the searching regions can be easily changed by merely changing the contents of the image projection partitioned mask data 58.

In the management of the feature point information in the embodiment, a function of determining/managing the effectiveness of an object which is a feature point can be utilized. In the position/posture arithmetic processing 62 in the camera position and posture acquiring unit 60 described above, a movement of a relative posture $\{_nH_{n-1}\}$ during an image processing cycle is determined on the basis of a camera frame $\{_nH_0\}$ obtained from relative movements of all the feature points and one previous posture information $\{_{n-1}H_0\}$ thereof. Thereafter, when a current movement of each feature point is estimated by utilizing the relative motion parameter $\{_nH_{n-1}\}$ on the matching coordinate values one previous to each feature point, a difference between the estimated coordinate values and the actual matching coordinate values is evaluated. When the evaluated value is greater than a certain threshold value, it is determined that the feature point is an invalid feature point. The feature point determined to be invalid in such invalid feature point determining processing 63 resets the feature point registration flag while maintaining the feature point search flag being set.

Accordingly, by comparing an image movement vector of a natural feature point and the posture information from the spatial sensor 1, it is possible to determine whether an object serving as a feature point of the peripheral image is a useful material body which can be a reference for a material body to be measured or an invalid moving material body. Consequently, due to only a fixed material body or a stopped material body in the world coordinate space around the spatial sensor being made to be the reference information for determining a posture, a more precise posture can be determined.

Note that the feature point determined to be invalid is processed such that regions at which there are feature points determined to be invalid are not registered in the invalid feature point tracking processing 55 of the image comparison unit 50. Namely, those are managed as invalid feature point information so as to be not added to new feature point search information again.

Accordingly, the invalid feature point is in a state in which the feature point registration flag is reset, and in a state in which the feature point search flag is set. Here, with respect to the feature points in which the feature point registration flag or the feature point search flag is set, normal search processing is carried out in the matching processing 53. Therefore, with respect to the feature points onto which matching has been correctly carried out again here, a tracking flag is set again. Further, when matching has not been carried out correctly, both of the feature point registration flag and the feature point search flag are reset, and the feature point information are discarded regardless of being valid or invalid. Next, an invalid feature point in which the feature point registration flag has not been set is not utilized for a following calculation for determining posture information in the camera position and posture acquiring unit 60.

As described above, an invalid feature point becomes an error factor in the camera position and posture acquiring unit 60. Therefore, if it will be simply discarded, there is a high possibility that it will be extracted again as a feature point in the next image processing cycle, and is utilized for posture calculation processing and the like again. As a result, calculation processings can be reduced by tracking the positions thereof and managing the invalid feature points, and further, it is possible to determine a precise posture.

When a size and a searching range of a registered image for identifying a feature point are fixed as in FIG. 4A in the image comparison unit 50 described above, generally, with respect to a translation movement of an object to be measured, the movements of the respective feature points of a distant object are little, but the movements at the respective feature points of an object at a near point are greater than that at a far point. Namely, the depth information estimated on the basis of the feature point at a near point greatly affects on an accuracy in measurement.

Accordingly, when the depth information z of the feature point has been estimated in a feature point Z estimation processing 61 in the camera position and posture acquiring unit 60 described above, the size of the registered image is organized again so as to be larger, and the searching range is made smaller in a case where the feature point is a distant feature point. On the other hand, in a case of the feature point at a near point, in contrast thereto, the size of the registered image is varied to be smaller, and the searching range is made larger. Note that this processing corresponds to the processing of "adaptive feature image setting section" according to CLAIMS.

Here, the solid angle of the projection optical system 410 is varied in accordance with a size of the object to be a subject and a distance up to the object. Therefore, unless optimum size and searching range of the registered image are varied in accordance with the distance information, a deformation and a moved range of the registered image are biased with respect to a variation in a posture to a greater extent as an image of a feature point at a nearer point is, and matching cannot be correctly carried out in searching feature point.

Then, by varying an image size and a searching range for the matching processing 53 to be optimum values on the basis of the depth information z of the registered feature point information, an attempt can be made to improve an accuracy in detecting posture and to optimize a processing speed.

The spatial sensor in the present embodiment can be utilized for a body motion detection apparatus which can measure a spatial posture of the degree of freedom of the portion by mounting it to, not only a hand or a head, but also a portion of a body where an attempt is made to measure. Further, there is no need to install a signal source serving as a reference near or around as a sensor using light, magnetism, or the like, and it can be utilized anywhere. Furthermore, when a plurality of spatial sensors are simultaneously attached, the spatial sensors can be utilized without any mutual interference, reduction in data update rate, or the like. Moreover, by attaching a spatial sensor as in FIG. 5A in the embodiment to a distal portion of a virtual or an actual writing tool, a movement of the pen tip in a writing state can be measured, and the spatial sensors can be utilized for a pen input type operation input apparatus and the like.

Further, provided that the spatial sensor in the present embodiment is attached to a digital camera and the like, the spatial posture information can be simultaneously recorded at the time of photographing images successively. The spatial sensor can be used for information for organizing the three-dimensional information of the photographed object are reorganized on the basis of these photographing information and spatial posture information, and the spatial sensor can be utilized as a three-dimensional image data organizing camera.

As described above, the spatial sensor is not only utilized by being directly mounted onto a body, but also the spatial sensor can measure a motion of the tool itself by being attached to a tool attached to the body or the like used by being held in a hand.

The present invention has been described above on the basis of the embodiments, the invention is not limited to the embodiments described above, and it goes without saying that various modifications and applications are possible within a range which does not deviate from the gist of the present invention.

As described above in detail, in accordance with the present invention, a motion detection apparatus which can precisely recognize a spatial position, a posture, and a movement of an object to be mounted, and a motion detection apparatus which can recognize a movement, a gesture, and the like of a portion of the body by directly or indirectly mounting such a motion detection apparatus to a body can be provided. Further, a motion detection apparatus which detects a movement of a position, a posture, and the like of the apparatus to be operated by being operated while grasping or holding a material body onto which such a motion detection apparatus has been mounted.

In particular, in the first invention, by determining a position and a posture in space by using information on a peripheral image from image pickup means in addition to the information on an inertia motion determined on the basis of the signals from an acceleration sensor or an angular velocity sensor, the position and the posture of the object to be measured can be more precisely measured.

In the second invention, because a projected image is the central projection divided into five regions, a spatial position and a direction of a feature point can be easily determined by a linear transformation expression of image information.

In the third invention, a larger number of images can be simultaneously fetched than that by a plane mirror type.

In the fourth invention, images from the sky periphery can be simultaneously fetched.

In the fifth through seventh inventions, there is no need to install a signal source serving as a reference near or around as a sensor utilizing light, magnetism, or the like, a spatial sensor can be utilized anywhere. Further, even if a plurality of spatial sensors are simultaneously attached, there are no mutual interference, reduction in data update rate, and the like.

In the eighth invention, by estimating the estimation for a position of a current feature point, rotational processing for a peripheral image thereof, and the like on the basis of the posture information from an inertia sensor, it is possible to process at an extremely high speed. Further, by narrowing a searching range when a moved amount of the inertia sensor is little, or by broadening the searching range when the moved amount is great, two purposes which are an improvement in a processing speed and an improvement in an accuracy in analyzing can be switched.

In the ninth invention, due to pixels and coordinate values being made information corresponding to one another, the comparison processing can be easily achieved even if those are converted into discontinuous or overlapped image information. Accordingly, it is possible to carry out matching processing in a state in which pixels are scattered, and the processing can be carried out more precisely and at a high speed.

In the tenth invention, because the respective pixels of the registered image are managed as scattered image data, it is possible to look those so as to correspond to each local point in a frame image, or to look those as the correspondences among the feature pixels scattered in the entire image. Namely, a feature region can be broadened or narrowed so as to correspond to the complexity of an image to be picked up, and as a result, an accuracy in processing and a processing speed can be controlled.

In the eleventh invention, due to only a material body which has been fixed or stopped in a peripheral image being as reference information by determining a feature point over a threshold value to be an invalid feature point, a more precise posture can be determined.

In the twelfth invention, by tracking positions of invalid feature points and managing the image positions thereof, it is possible to determine a precise posture with less calculation processings.

In the thirteenth invention, even if reference marks such as feature points or the like having known depth information are not made to be always within a visual field, it is possible to continue to determine posture information with less errors by continuing to achieve detection processings for the feature points.

In the fourteenth invention, a direction and a classification of a projected image can be simply known on the basis of a current feature point position, and calculation processing can be carried out at a high speed.

In the fifteenth invention, an attempt is made to improve an accuracy in detecting posture and to optimize a processing speed by varying an image size and a searching range for matching to be optimum values on the basis of the depth information of a registered feature point information.

In the sixteenth invention, provided that there are identification marks, initialization processing can be simply carried out anytime and anywhere.

In the seventeenth invention, provided that there are identification marks, initialization processing can be simply carried out anytime and anywhere. Moreover, even if the shapes of the identification marks are changed, it is possible to correspond thereto.

In the eighteenth, nineteenth, and twenty-first inventions, there is no need to mount a special identification mark at the time of initialization.

In the twentieth invention, there is no need to mount a special identification mark at the time of initialization, and moreover, it is possible to correct feature point data during the time of measurement after the initialization.

In the twenty-second invention, by mounting a motion detection apparatus to a material body operated by being grasped or held in a hand, a movement of a position, a posture, and the like of the apparatus to be operated can be detected.

What is claimed is:

1. A motion detection apparatus comprising:
    an inertia motion detecting section which detects an inertial motion of an object to be measured by using at least one of an acceleration sensor and an angular velocity sensor;
    an image pickup section, which is fixed to the inertia motion detecting section, and which comprises a fisheye lens for picking up a peripheral image of the object to be measured;
    an image comparing section which compares an image picked up at a first timing with an image picked up at a second timing by the image pickup section;
    a camera position and posture acquiring section which detects a position and a posture of the object to be measured by using a result obtained by the image comparing section; and
    a spatial position and posture acquiring section which detects a position and a posture in space of the object to be measured based on outputs from the inertia motion detecting section and the camera position and posture acquiring section,
    wherein when the camera position and posture acquiring section detects the position and posture of the object to be measured, the camera position and posture acquiring section sets a coordinate system for motion detection, extracts a feature point based on the image at the first timing picked up by the image pickup section, sets a rectangular area having the feature point as a center of position, registers a position and a posture of the image pickup section in the coordinate system, calculates a position and a posture of the image pickup section at the second timing based on relative motion information obtained by the inertia motion detecting section and the position and posture of the image pickup section as registered at the first timing, estimates and stores coordinates of the image at the second timing, in the rectangular area, by calculating an estimated position of each pixel in the rectangular area based on the position and posture information and a relational expression of an image height on an image forming surface at an angle of incidence on the fisheye lens, and executes a matching process based on the rectangular area registered at the first timing and the rectangular area stored at the second timing.

2. The motion detection apparatus according to claim 1, wherein the camera position and posture acquiring section further comprises an invalid feature point determining section which, based on camera position and posture information obtained from motion parameters of respective feature points and depth information estimated with respect to the feature points, determines an error between motion parameters measured from images including the respective feature points and a motion vector obtained from the camera position and posture information, and determines a feature point in which the error is over a certain threshold value to be an invalid feature point.

3. The motion detection apparatus according to claim 2, wherein the invalid feature point determining section comprises an invalid feature point tracking section which tracks positional information of the invalid feature point until said feature point is no longer invalid.

4. The motion detection apparatus according to claim 1, wherein the camera position and posture acquiring section:
    registers three-dimensional information of a frame image as feature point information and a current camera frame in a new registration of a feature point,
    tracks the feature point from a time when the feature point appears until the feature point disappears,
    updates the three-dimensional information of the frame image in accordance therewith,
    registers three-dimensional information of a second feature point obtained from a current camera frame, once the second feature point appears,
    tracks positions of a plurality of feature point images which appear and disappear in successive images, and acquires a current camera frame with respect to a world coordinate space based on movements of said plurality of features.

5. The motion detection apparatus according to claim 1, wherein the image pickup section further comprises an optical section which projects images, and the image comparing section comprises an image projection partitioned mask section which identifies and partitions incident optical axes of the optical section.

6. The motion detection apparatus according to claim 1, wherein the image comparing section comprises an adaptive feature point image setting section which analyzes depth information of a feature point image, and which switches a size of the feature point image and a feature point searching range at a time of registration, or a number of registrations of feature points, in accordance with the analyzed depth information.

7. A motion detection apparatus comprising:
an inertia motion detecting section which detects an inertial motion of an object to be measured by using at least one of an acceleration sensor and an angular velocity sensor;
an image pickup section, which is fixed to the inertia motion detecting section, and which comprises a curved mirror for picking up a whole sky peripheral image of the object to be measured;
an image comparing section which compares an image picked up at a first timing with an image picked up at a second timing by the image pickup section;
a camera position and posture acquiring section which detects a position and a posture of the object to be measured by using a result obtained by the image comparing section; and
a spatial position and posture acquiring section which detects a position and a posture in space of the object to be measured based on outputs from the inertia motion detecting section and the camera position and posture acquiring section,
wherein when the camera position and posture acquiring section detects the position and posture of the object to be measured, the camera position and posture acquiring section sets a coordinate system for motion detection, extracts a feature point based on the image at the first timing picked up by the image pickup section, sets a rectangular area having the feature point as a center of position, registers a position and a posture of the image pickup section in the coordinate system, calculates a position and a posture of the image pickup section at the second timing based on relative motion information obtained by the inertia motion detecting section and the position and posture of the image pickup section as registered at the first timing, estimates and stores coordinates of the image at the second timing, in the rectangular area, by calculating an estimated position of each pixel in the rectangular area based on the position and posture information and a relationship of an image height on an image forming surface at an angle of incidence on the curved mirror, and executes a matching process based on the rectangular area registered at the first timing and the rectangular area stored at the second timing.

8. The motion detection apparatus according to claim 7, wherein the camera position and posture acquiring section further comprises an invalid feature point determining section which, based on camera position and posture information obtained from motion parameters of respective feature points and depth information estimated with respect to the feature points, determines an error between motion parameters measured from images including the respective feature points and a motion vector obtained from the camera position and posture information, and determines a feature point in which the error is over a certain threshold value to be an invalid feature point.

9. The motion detection apparatus according to claim 8, wherein the invalid feature point determining section comprises an invalid feature point tracking section which tracks positional information of the invalid feature point until said feature point is no longer invalid.

10. The motion detection apparatus according to claim 7, wherein the camera position and posture acquiring section:
registers three-dimensional information of a frame image as feature point information and a current camera frame in a new registration of a feature point,
tracks the feature point from a time when the feature point appears until the feature point disappears,
updates the three-dimensional information of the frame image in accordance therewith,
registers three-dimensional information of a second feature point obtained from a current camera frame, once the second feature point appears,
tracks positions of a plurality of feature point images which appear and disappear in successive images, and
acquires a current camera frame with respect to a world coordinate space based on movements of said plurality of features.

11. The motion detection apparatus according to claim 7, wherein the image pickup section further comprises an optical section which projects images, and the image comparing section comprises an image projection partitioned mask section which identifies and partitions incident optical axes of the optical section.

12. The motion detection apparatus according to claim 7, wherein the image comparing section comprises an adaptive feature point image setting section which analyzes depth information of a feature point image, and which switches a size of the feature point image and a feature point searching range at a time of registration, or a number of registrations of feature points, in accordance with the analyzed depth information.

13. A motion detection apparatus comprising:
an inertia motion detecting section which detects an inertial motion of an object to be measured by using at least one of an acceleration sensor and an angular velocity sensor;
an image pickup section, which is fixed to the inertia motion detecting section, and which comprises at least four plane mirrors for picking up a whole sky peripheral image of the object to be measured;
an image comparing section which compares an image picked up at a first timing with an image picked up at a second timing by the image pickup section;
a camera position and posture acquiring section which detects a position and a posture of the object to be measured by using a result obtained by the image comparing section; and
a spatial position and posture acquiring section which detects a position and a posture in space of the object to be measured based on outputs from the inertia motion detecting section and the camera position and posture acquiring section,
wherein when the camera position and posture acquiring section detects the position and posture of the object to be measured, the camera position and posture acquiring section sets a coordinate system for motion detection, extracts a feature point based on the image at the first timing picked up by the image pickup section, sets a rectangular area having the feature point as a center of position, registers a position and a posture of the image pickup section in the coordinate system, calculates a position and a posture of the image pickup section at the second timing based on relative motion information obtained by the inertia motion detecting section and the position and posture of the image pickup section as registered at the first timing, estimates and stores coordinates of the image at the second timing, in the rectangular area, by calculating an estimated position of each pixel in the rectangular area based on the position and posture information and a relationship of an image height on an image forming surface at an angle of incidence on the at lest four plane mirrors, and executes a matching process based on the rectangular area registered at the first timing and the rectangular area stored at the second timing.

14. The motion detection apparatus according to claim 13, wherein the camera position and posture acquiring section further comprises an invalid feature point determining section which, based on camera position and posture information obtained from motion parameters of respective feature points and depth information estimated with respect to the feature points, determines an error between motion parameters measured from images including the respective feature points and a motion vector obtained from the camera position and posture information, and determines a feature point in which the error is over a certain threshold value to be an invalid feature point.

15. The motion detection apparatus according to claim 14, wherein the invalid feature point determining section comprises an invalid feature point tracking section which tracks positional information of the invalid feature point until said feature point is no longer invalid.

16. The motion detection apparatus according to claim 13, wherein the camera position and posture acquiring section:
   registers three-dimensional information of a frame image as feature point information and a current camera frame in a new registration of a feature point,
   tracks the feature point from a time when the feature point appears until the feature point disappears,
   updates the three-dimensional information of the frame image in accordance therewith,
   registers three-dimensional information of a second feature point obtained from a current camera frame, once the second feature point appears,
   tracks positions of a plurality of feature point images which appear and disappear in successive images, and
   acquires a current camera frame with respect to a world coordinate space based on movements of said plurality of features.

17. The motion detection apparatus according to claim 13, wherein the image pickup section further comprises an optical section which projects images, and the image comparing section comprises an image projection partitioned mask section which identifies and partitions incident optical axes of the optical section.

18. The motion detection apparatus according to claim 13, wherein the image comparing section comprises an adaptive feature point image setting section which analyzes depth information of a feature point image, and which switches a size of the feature point image and a feature point searching range at a time of registration, or a number of registrations of feature points, in accordance with the analyzed depth information.

* * * * *